Dec. 1, 1964    J. E. HODGSON    3,158,994
SOLID FUELS AND METHODS OF PROPULSION
Filed Dec. 29, 1959    10 Sheets-Sheet 1
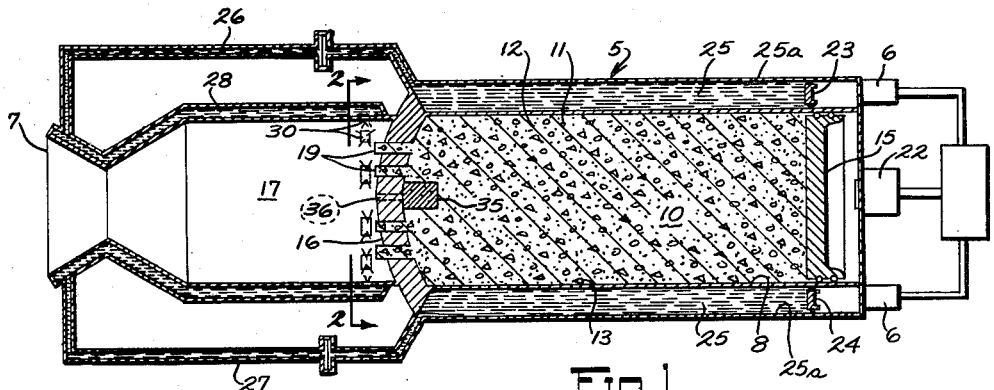
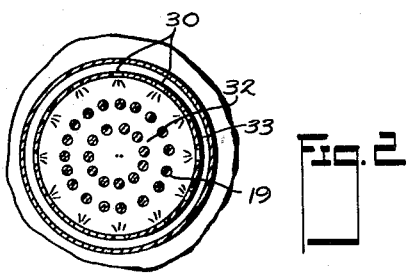
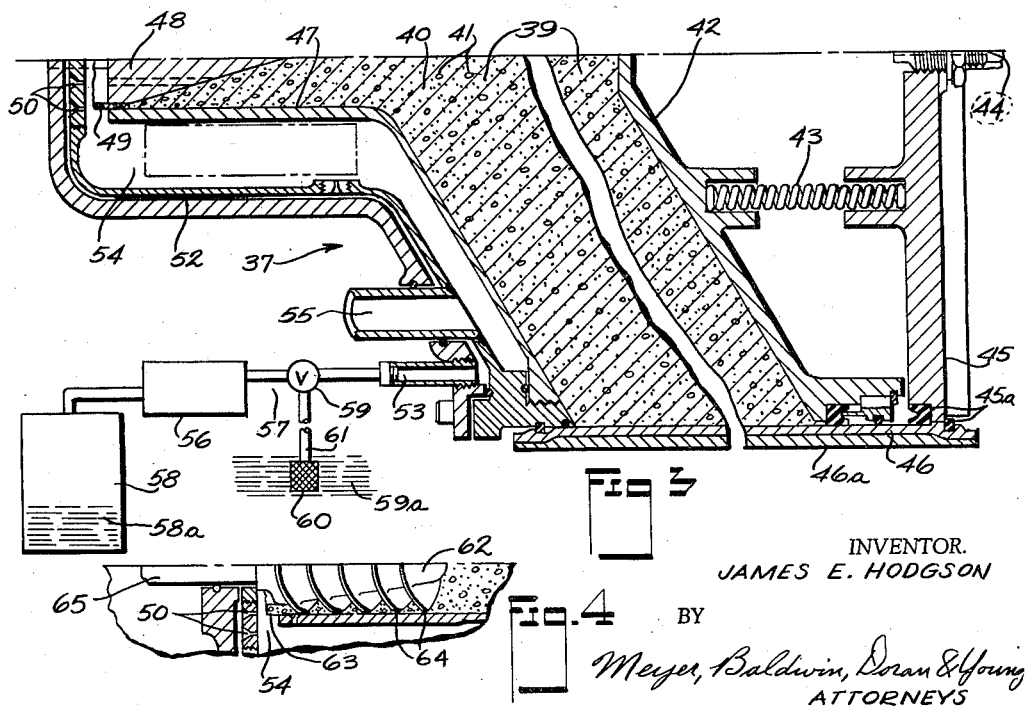
INVENTOR.
JAMES E. HODGSON
BY
Meyer, Baldwin, Doran & Young
ATTORNEYS

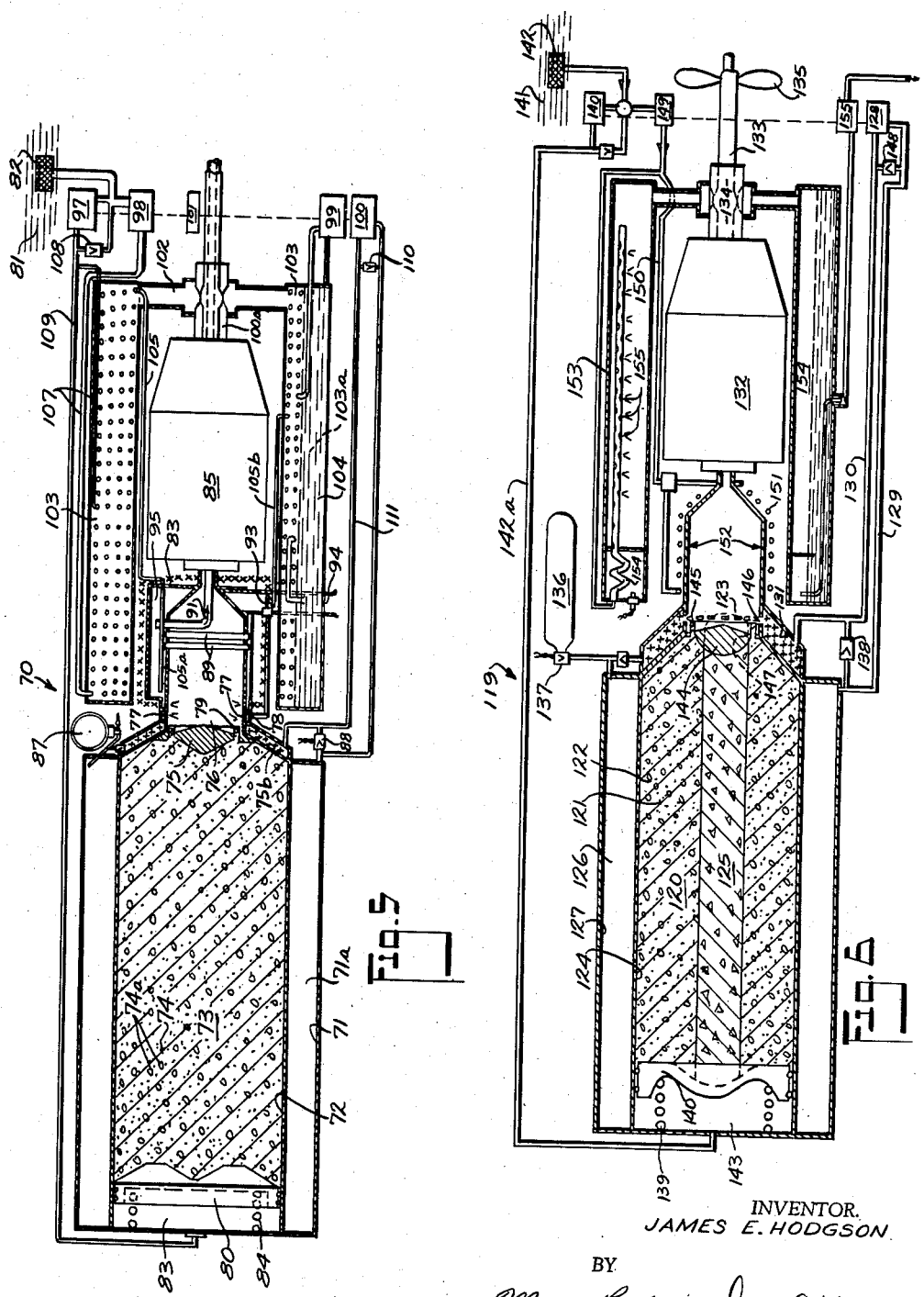

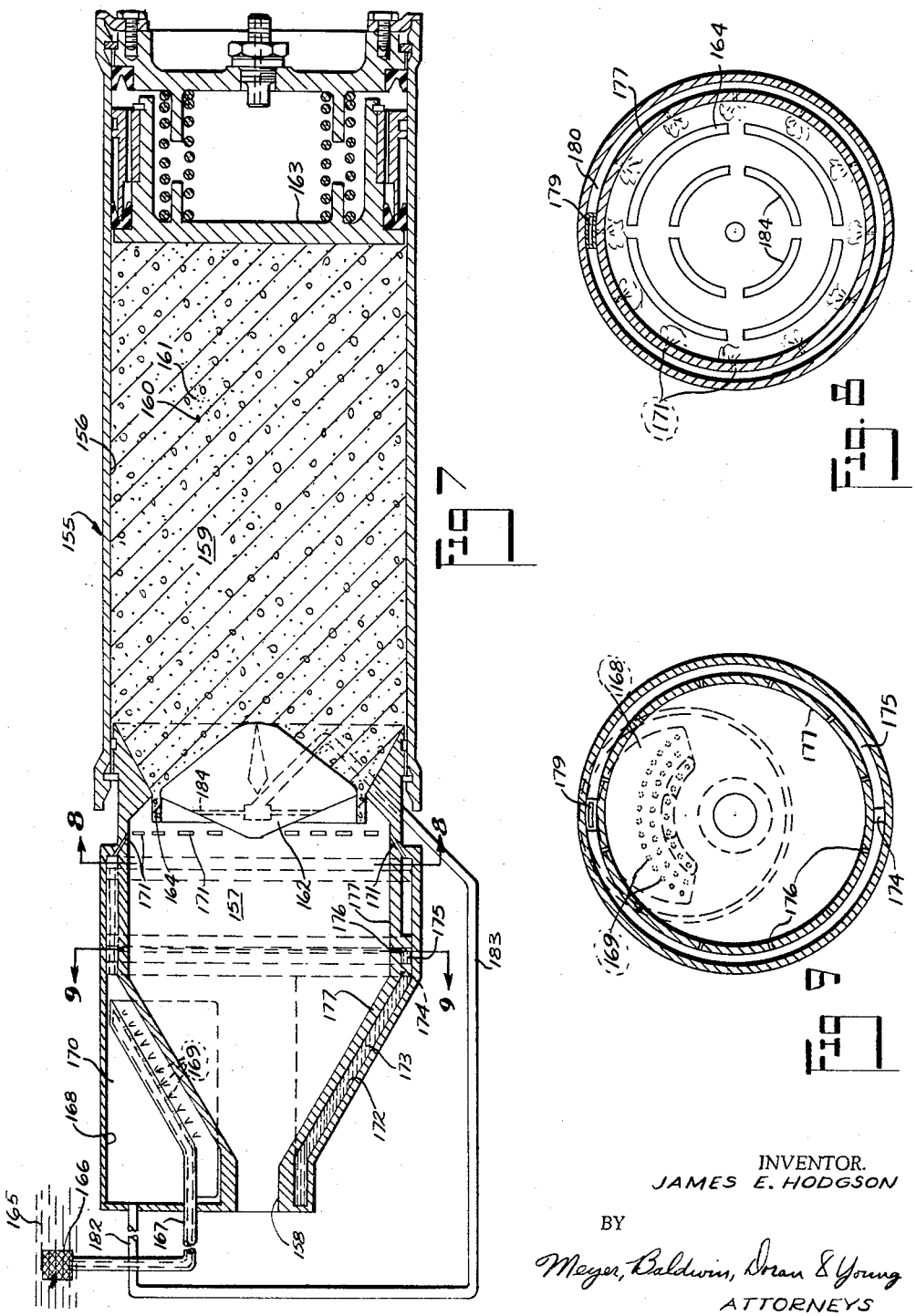

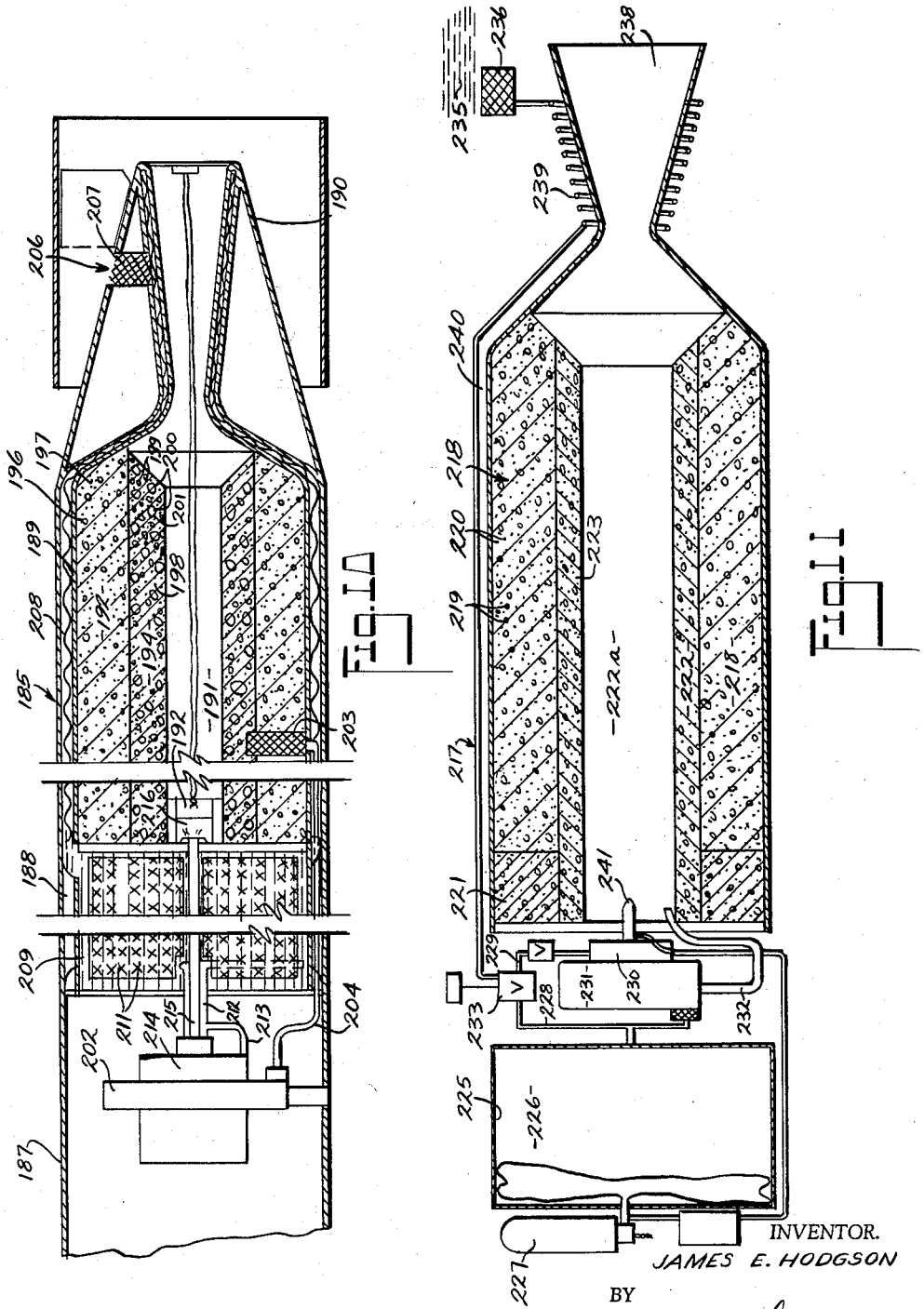

Dec. 1, 1964   J. E. HODGSON   3,158,994
SOLID FUELS AND METHODS OF PROPULSION
Filed Dec. 29, 1959   10 Sheets-Sheet 5
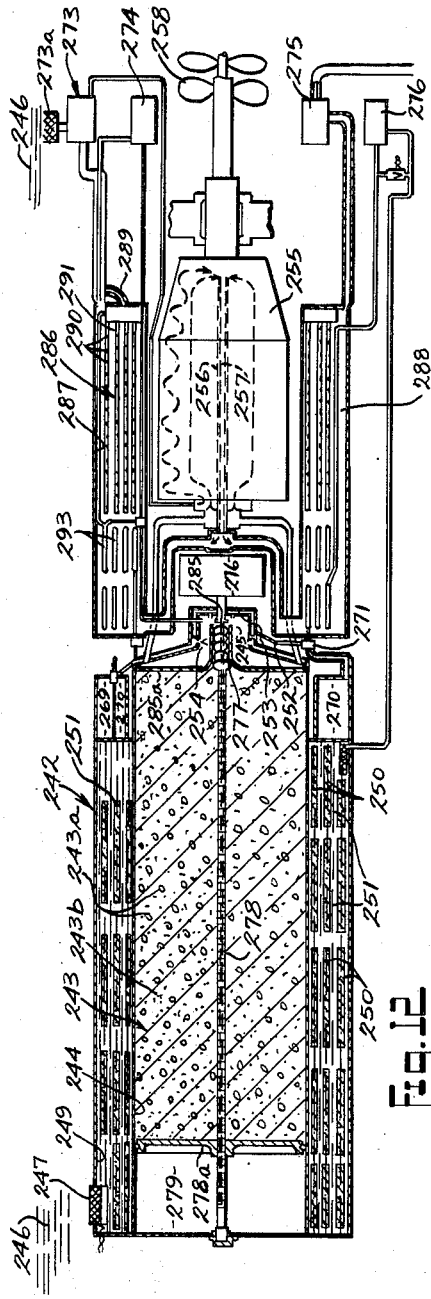
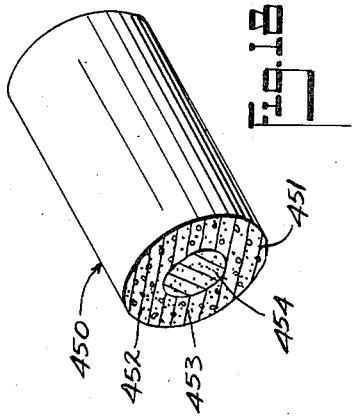
INVENTOR.
JAMES E. HODGSON
BY
ATTORNEYS

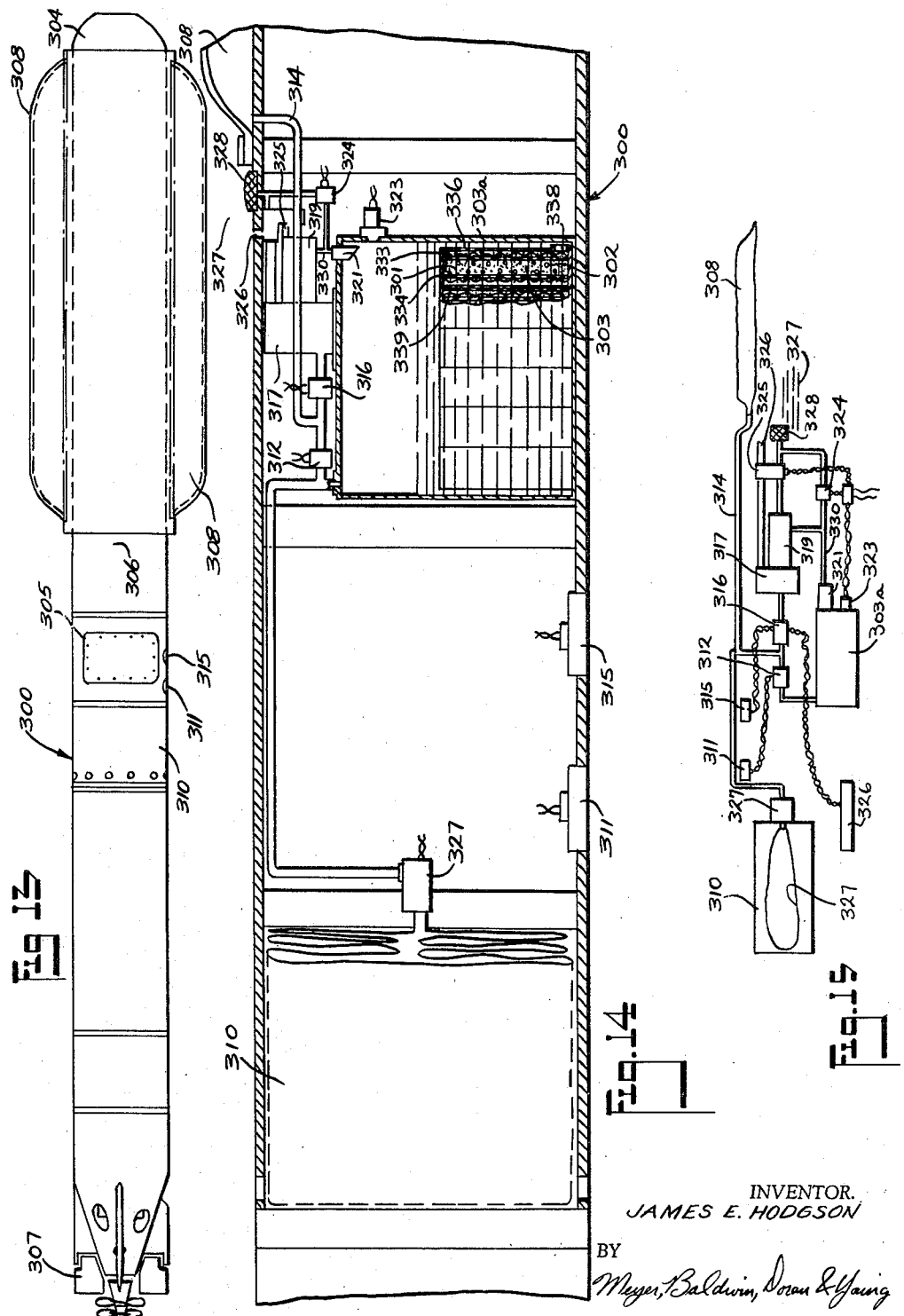

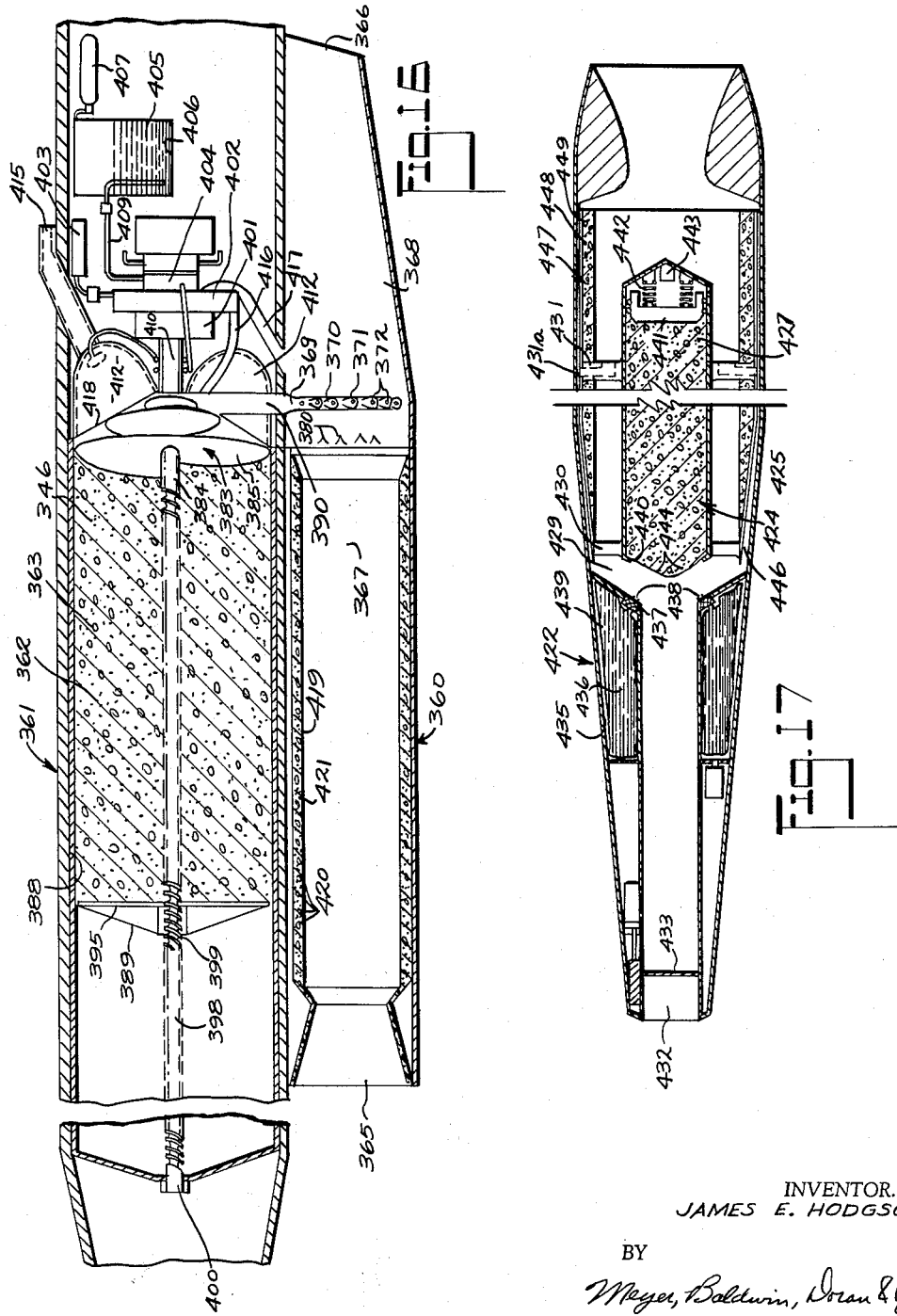

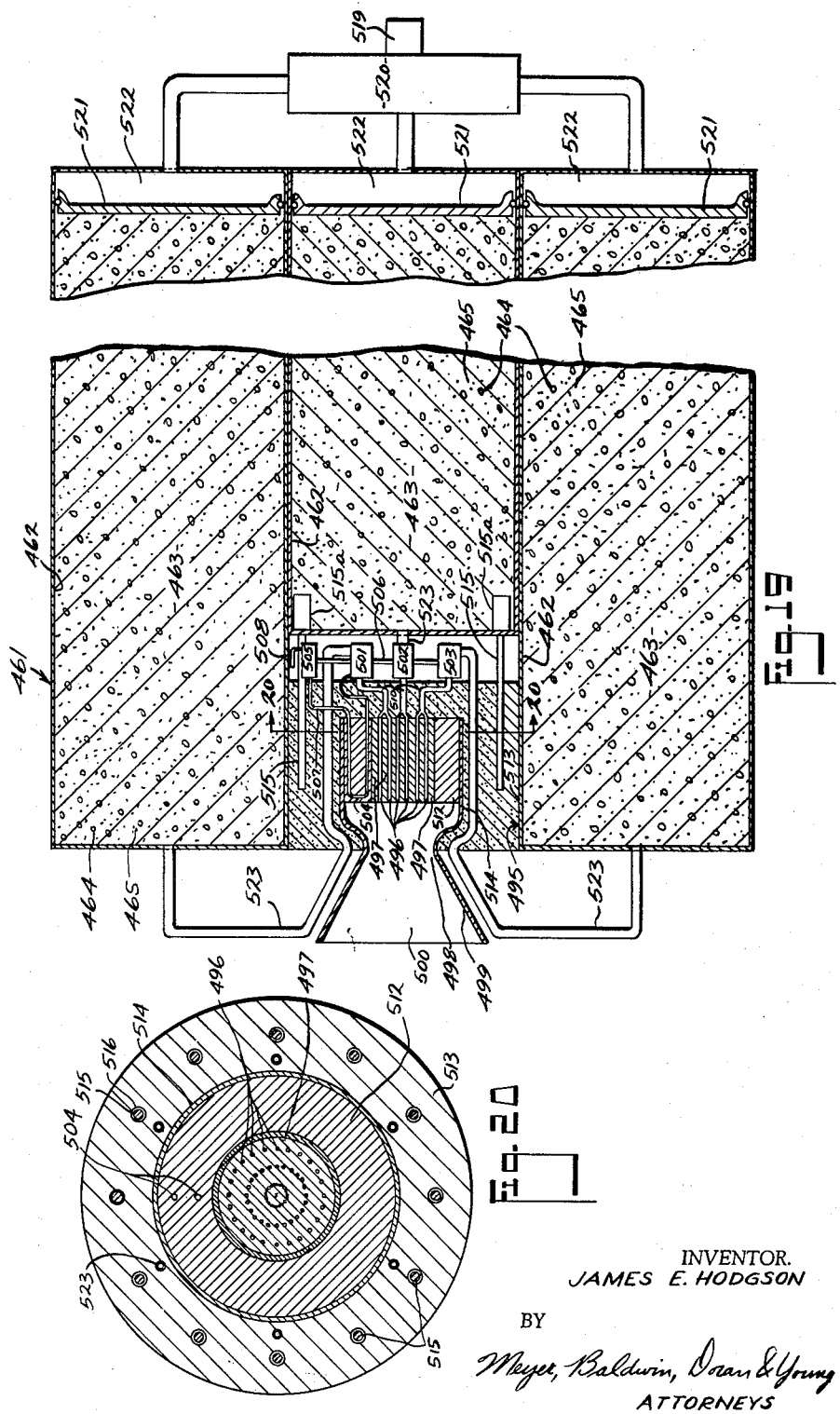

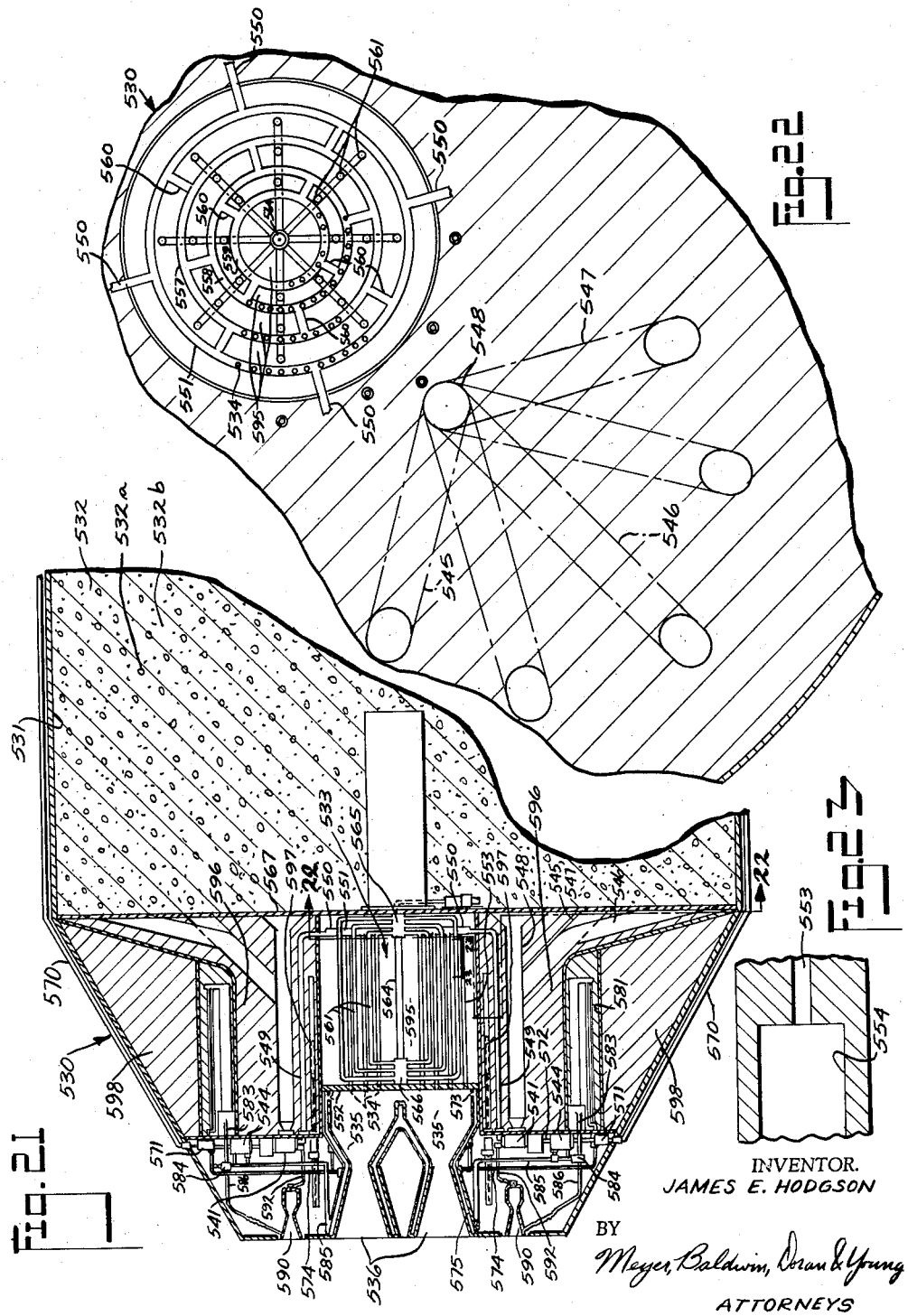

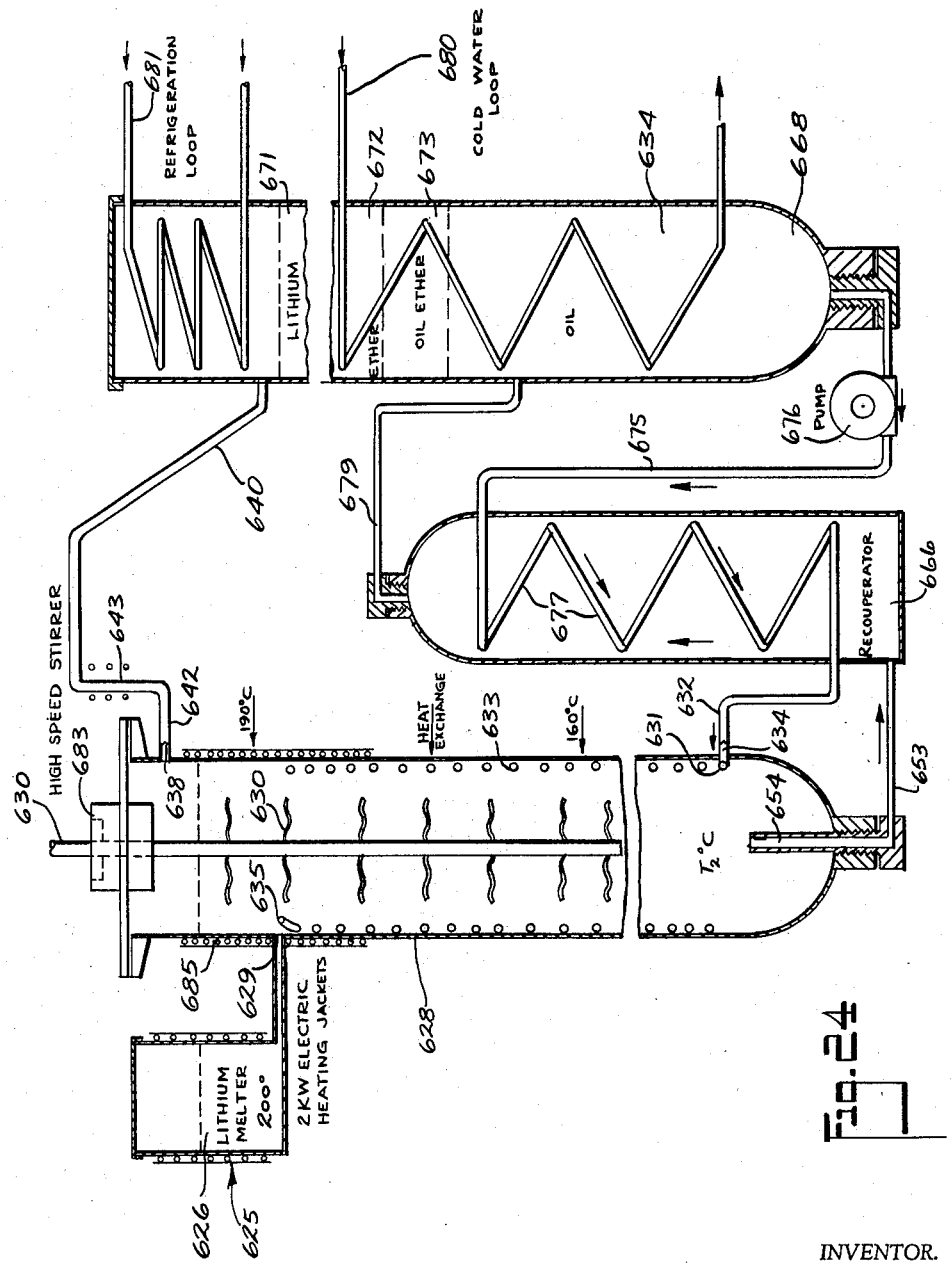

United States Patent Office 3,158,994
Patented Dec. 1, 1964

3,158,994
SOLID FUELS AND METHODS OF PROPULSION
James E. Hodgson, Cleveland, Ohio, assignor to Solid Fuels Corporation, Cleveland, Ohio, a corporation of Ohio
Filed Dec. 29, 1959, Ser. No. 862,692
10 Claims. (Cl. 60—35.4)

The present invention is directed to a solid fuel having finely divided fuel particles bound within a metallic or metalloid matrix, and more particularly to metal-containing fuel particles bound within a matrix of a relatively low melting metal which is preferably lithium. The metal-bound fuels preferably are burned with steam, water vapor, air or other oxidizing material including hydrogen peroxide and perchloryl fluoride in propulsion systems such as rocket engines, torpedo engines and ramjet engines and auxiliary power units.

It is an object of the present invention to provide a solid fuel which is capable of delivering a specific impulse in the neighborhood of 300 or more.

It is an object to provide a solid slug which is steam reactive and capable of delivering a specific impulse in the neighborhood of 300 or more.

It is an object of the present invention to provide an improved solid fuel slug comprising a metallic binder such as lithium, magnesium, aluminum, or a low melting alloy of magnesium-aluminum, magnesium-lithium or aluminum-lithium and/or hydrogen treated and absorption, combustion sensitized metals and alloys of the same; the binder containing finely divided fuel particles dispersed therein for reaction with an oxidizer material.

It is an object to provide a method of making an improved solid fuel that, surprisingly, is outstanding for water and steam reaction by mixing a powdered metal such as lithium having a low melting point and a powdered metal hydride such as lithium hydride, lithium aluminum hydride or lithium borohydride, heating the mixture to a temperature below the melting point of lithium but to a temperature sufficient to enable the lithium to flow readily under pressure, and thereafter pressing or extruding the heated powdered mixture into shape to form a solid fuel slug in which the metal hydride particles are bound together by lithium.

It is an object to provide a method of preparing an improved solid fuel having a specific impulse of 300 or more and yet is steam and water reactive.

It is an object to provide a method of preparing a high energy fuel composition by using a binder of powdered magnesium, aluminum, a magnesium aluminum alloy, a magnesium lithium alloy or a lithium aluminum alloy (which may be hydrogen treated) with fuel particles such as lithium hydride to form a mixture of powdered materials, and pressing the mixture to form the same, and thereafter sintering the mixture to form a solid fuel slug.

It is an object to provide an oxidizing solution for use with a metallic-bound fuel by dissolving lithium perchlorate in sea water.

It is an object of the present invention to provide an improved method of propelling a torpedo by continuously dissolving lithium borohydride in sea water and using the solution to combustion condition, and burn with a lithium-bound solid fuel slug in a torpedo engine system.

It is an object of the present invention to prepare an improved fuel slug by using a relatively strong outer skin of a metal bound-metal hydride fuel slug and a relatively weak, brittle or crumbly inner core or plurality of cores at a mixture of about 90% magnesium or 90% aluminum powder, or 50/50 lithium aluminum alloy powder or boron powder and 10% lithium hyride powder, or other hydride, or an inner core of propellant.

It is an object to provide an improved fuel slug by using an outer skin of conventional propellant and an inner core of metal particles dispersed in a metal binder or vice versa.

It is an object of the present invention to provide an improved solid fuel composition for burning with steam to propel a torpedo, said solid composition comprising finely divided particles of magnesium and lithium hydride or other solid hydride bound within a matrix of lithium.

It is an object of the present invention to provide an improved solid fuel composition for burning with steam to propel a torpedo, said solid composition comprising finely divided particles of magnesium bound within a matrix of lithium hydride.

It is an object of the present invention to provide improved water-reactive solid fuel slug capable of delivering a specific impulse of 300 or more comprising finely divided magnesium particles bound within a matrix of lithium, said matrix also binding therewithin particles of a combustion conditioning agent such oxidizing materials including lithium nitrate and cellulose nitrate (which may be plastic-coated), and hydrides including lithium hydride, lithium aluminum hydride, lithium borohydride, to help expose fresh metallic surfaces for burning, to promote fuel dispersion and propellant mixing, and to invigorate the combustion.

It is an object to provide a method of utilizing a metallic-bound fuel slug containing metal hydride particles for propelling a torpedo or other underwater vehicle silently without using an engine or simply reacting the slug to produce hydrogen gas to fill a stretchable bag to provide buoyancy and exhausting said gas to provide power for descent.

It is an object to provide an inexpensive method of continuously producing finely divided lithium particles suitable for use as a starting material for a binder for fuel slugs.

Other objects will be apparent from the description that follows, from the appended claims, and the drawings in which:

FIG. 1 is a diagrammatic drawing illustrating one embodiment of the present invention in which a cross section of a propellant and combustion system suitable for torpedo or rocket applications is shown containing an improved solid fuel according to the present invention;

FIG. 2 is a sectional view taken along the lines indicated at 2—2 in FIG. 1;

FIG. 3 shows a cross sectional view of an underwater torpedo propulsion combustion chamber of the type in which the improved solid fuel of unusually large diameter is utilized by regeneratively fusing and extruding the fuel into a combustion chamber and burning it with steam, super heated sea water or other suitable oxidizer.

FIG. 4 is a sectional view taken along the lines indicated at 3—3 in FIG. 3 and illustrating another means of extruding a solid slug into a combustion chamber of a torpedo engine system by means of a screw or Moyno type progressive cavity pump;

FIG. 5 shows a cross sectional view of an underwater torpedo closed steam cycle propulsion system in which the improved solid fuel is effectively utilized by extruding the fuel into a combustion chamber and burning the fuel essentially with steam and/or other oxidizer and using the heat of combustion to produce steam in a separate closed steam cycle for efficient propulsion even at great depths;

FIG. 6 is a sectional view of a torpedo propulsion system in which the metal-bound fuel is utilized by extruding it into a combustion chamber and burning it with decomposed hydrogen peroxide and with lithium perchlorate, the exhaust products of which are fully condensable;

FIG. 7 is a sectional view of a torpedo propulsion system in which the metal-bound fuel is extruded into a combustion chamber and burned with steam, the steam being regeneratively raised in a chamber-encasing boiler and the steam being usable for engine propulsion and, afterwards, being burned if so desired;

FIG. 8 is a sectional view taken along the lines 8—8 in FIG. 7 and shows a steam and concentrated superheated sea water injection system;

FIG. 9 is a sectional view taken along the lines 9—9 in FIG. 7 and shows a water injection and vaporization-chamber cooling system;

FIG. 10 shows a cross sectional view of an air to underwater torpedo propulsion system in which a solid fuel slug of the present invention is burned in situ with an oxidizer material comprising a lithium borohydride solution made by dissolving solid lithium borohydride continuously in sea water;

FIG. 11 shows a cross section view of an air-to-underwater rocket type torpedo propulsion system in which a single or composite coaxial solid fuel slug is burned in situ in the combustion chamber first with hydrogen peroxide or perchloryl fluoride during airborne flight and with steam during underwater operation;

FIG. 12 shows a cross sectional view of a fully condensing torpedo propulsion system in which the exhaust products are fully condensing and in which the improved solid fuel is burned with a solution of lithium perchlorate in sea water;

FIG. 13 is a side elevational view of a silent running homing torpedo using inertial propulsion showing an expandable bag in section;

FIG. 14 is a sectional view of the gas generator portion using a fuel slug according to the present invention;

FIG. 15 is a schematic view of the intertial propulsion system for the torpedo of FIG. 13;

FIG. 16 is a cross sectional view of a complete ram-jet engine and fuel-fusing and feed system as part of a missile which in turn carries the improved solid fuel of the present invention within its fuselage. The ram-jet engine also shows a combustion resistant solid fuel sleeve in situ as a combustion chamber lining;

FIG. 17 is a cross sectional view of a ram-jet engine illustrating both the use of a solid metal-bound fuel for extrusion and for an in situ application in which the fuel is mounted internally within a combustion chamber;

FIG. 18 shows a perspective view of a fuel slug made according to the present invention in which a strong outer core of light metal hydride particles within a lithium or other metal matrix is disposed around a weak, brittle or crumbly fast-burning inner core of about 90% aluminum or boron or boron carbide powder and 10% of a light metal hydride powder;

FIG. 19 shows a cross sectional view of a nuclear rocket engine in which the improved solid fuel is utilized by extruding the same into a nuclear reactor where it is vaporized and heated to a high temperature in the reactor and then expelled to produce thrust;

FIG. 20 is a sectional view taken along the lines indicated at 20—20 in FIG. 19;

FIG. 21 shows a vertical sectional view of a nuclear chemical hybrid rocket engine in which the solid fuel is utilized in a fusing and feeding system therefore, the fuel being vaporized in the reactor and then further chemically burned with a liquid oxidizer in the combustion chamber in the usual way before being expelled at the nozzle to produce thrust;

FIG. 22 is a transverse sectional view taken along the lines 22—22 indicated in FIG. 21;

FIG. 23 is a sectional view on an enlarged scale taken along the lines 23—23 indicated in FIG. 21; and FIG. 24 shows an elevational view of process equipment used to produce finely divided lithium or phosphorous particles continuously.

The present invention provides an improved solid fuel composition which has a metal or metal alloy binder and can be used advantageously in a torpedo engine system, a ram-jet engine system, all types of auxiliary power unit engine systems and a rocket engine system to provide a specific impulse of 300 or more. The metal binder for the solid fuel composition, which, surprisingly, can be burned even with steam or water vapor, may be a metal alloy such as a magnesium-lithium alloy, a magnesium-aluminum alloy, a magnesium-aluminum-lithium alloy and an aluminum-lithium alloy, athough it is preferably lithium or magnesium.

Thus a metal-bound solid fuel composition is provided which has excellent thermal stability and high heat release. One outstanding advantage obtained by using the solid fuel slug is that a water reactive solid fuel can be made easily and used in a torpedo propulsion system, and when magnesium and/or lithium and the light metal hydrides is incorporated as the main fuel, the solid composition burns readily in steam or water vapor.

Lithium metal generally is the preferred binding material and when desirable, such as in rocket fuels, a great many high energy fuel particles and combustion conditioning agents such as aluminum boron and lithium hydride can be uniformly dispersed and bound within the lithium metal matrix in percentages only limited by structural instability.

In other engines such as ram-jet engines, substantial amounts of lithium hydride, say from 5 to 50% by weight, can be dispersed within a metal or metal alloy binder having a melting point less than that of the lithium hydride or other fuel particle. Excellent binders include magnesium, aluminum, and alloys of lithium with aluminum and magnesium in which the lithium is the major metal constituent and is present in the highest practical concentrations and also three-component alloys of lithium, aluminum and magnesium, again where the lithium content is preferably the highest single alloy component and is present in the highest attainable concentration.

In the case of engine systems that are used as cheap and/or auxiliary power plants, phosphorus is a suitable binder for metal-containing fuel particles. Even though phosphorus has a much lower heat release than lithium, it can be used in some cases as the binder material because it is cheap, readily available and has a low melting point, and hence adds to the ease of making and utilizing fuel slugs.

The process of making a fuel slug of phosphorus is not expensive and does not require complicated equipment. The phosphorus (melting point 40° C.) is heated under water enough to melt it but not enough so that it forms phosphides with fuel additions. Powdered fuel particles such as boron carbide, boron, or aluminum powder then are added to the fused phosphorous and mixed. Alternatively, when hydrides are included the ingredients may be mixed in an inert atmosphere. The mixture, then, is readily cast or extruded into the fuel form desired.

Sodium, potassium and sodium-potassium alloys may be used as cheap low energy replacement binders as is obvious.

The present invention also provides improved methods of burning solid fuel compositions in which fuel particles are dispersed uniformly within a metal binder. Also, the present invention provides improved torpedo engine propulsion systems as well as improved and outstanding ram-jet and rocket engine systems which employ a metal-bound fuel slug. The versatile fuel slug is capable of being burned with water vapor steam, air or other oxidizers such as perchloryl fluoride or hydrogen peroxide. The fuel slug, in some cases, is extruded into the combustion chamber and burned with a combustion agent. Adding to its versatility, in still another application, the fuel slug is burned in situ and combustion agents such as hydrogen peroxide are injected and burned at the exposed surfaces of the fuel slug.

In another aspect of the present invention, a method of continuously forming finely divided lithium metal particles is provided. Using a continuous method, lithium or other similar particles are inexpensively produced on a continuous basis so that otherwise expensive fuel compositions can be widely employed in engine systems.

Further, the present invention provides an outstanding water reactive fuel slug in which magnesium particles are reacted with steam or water vapor to produce outstanding heat release and a specific impulse of 300 or more based on the fuel weight. In a preferred composition, finely divided particles of magnesium generally 10 to 100 microns in average diameter or even smaller particles such as down to 1 to 2 microns when available, are bound together with a lithium matrix. The fuel composition also contains a combustion conditioning agent such as light element hydride of which lithium hydride, lithium aluminum hydride, lithium borohydride, magnesium hydride, aluminum hydride and decaborane are best. Or in some cases an oxidizing or explosive material including lithium perchlorate may be used and which is first film coated with resin or cellulose nitrates. Thus completely stoichiometric ratios of resin coated lithium perchlorate may be bound in a lithium binder as well as ammonium perchlorate and others. The addition of small amounts of the combustion conditioning agent selected in accordance with energy demands and burning rate required provided outstanding burning results by exposing fresh burning surfaces of metal fuel, by creating fissures and cracks in the surface, or by sputtering the metal particles out into the combustion stream by under surface decomposition.

Thus, in accordance with the present invention, various amounts of metal binder and metal containing fuel particles may be used along with generally relatively small amounts of the combustion conditioning agents such as lithium hydride (high temperature decomposer 760°–850° C.); or decaborane, low temperature (decomposer 100–170° C.); or oxygen and fluorine containing solids such as cellulose nitrate and polytetrafluoroethylene. In general, different amounts of fuel and metal binder are required for the torpedo engine systems than are required for the rocket engine systems. Also as to whether the torpedo engine gas system requires a condensable exhaust, that is fully oxidized for deep diving, with unimpeded performance, or if shallow depth running is required, when sea water combustion exhaust hydrogen is acceptable. Also, still different amounts are required for ram-jet engine systems than the rocket engine systems or the torpedo propulsion systems, and subject to altitude and speed demands in the ram-jet and also performance and application demands in the rocket. However, in most of the applications, it is highly important that at least two to three percent of the total fuel composition be a combustion conditioning agent such as a R.D.X. double base nitro powder, cellulose nitrate, or a metal hydride such as lithium hydride, decaborane or lithium aluminum hydride, aluminum hydride magnesium hydride to promote even and vigorous burning, it being well known, for example, that solid metal fuel slugs made only of metal particles such as aluminum form a surface coating of aluminum oxide readily thereon, which in turn, greatly decrease their activity and tend to stop the burning. This oxide formation applies to other metals as well as aluminum in a normal compacted powdery or solid composition.

The combustion conditioning agents may be added in relatively large amounts in some application such as rocket combustion when high hydrogen yields one required to produce very desirable low molecular weights in the exhaust gases. Generally, a range of 10 to 20 percent by weight of the total fuel composition is preferred. However, in some cases, up to 50 percent by weight may be advantageous. In the case of a nuclear rocket engine, a light metal hydride such as lithium hydride which is rich in hydrogen may be used in amounts as high as 85 to 90 percent by weight of the total fuel composition, since the hydride is vaporized, decomposed and superheated to provide energy for thrust at the lowest possible molecular weight into the exhaust stream.

In accordance with the present invention, the metal binder is highly important and should be present in amounts of generally 10 to 50 percent by weight of the total fuel slugs, depending on energy reactivity and structural integrity demanded. However, since the lithium binder or metal alloy binder also acts as a fuel, in some cases the binder material may be increased 75 to 95% by weight of the fuel slug as in some air steam and water reaction conditions.

In any event, whether the application be a rocket, ram-jet or a torpedo engine, particularly outstanding results have been obtained when the binder material is about 15 to 40 percent by weight and the best results with the widest range of formulations are generally obtained when the binder comprises about 25 to 35 percent by weight of the total fuel composition. It is obvious that for a slug of desired structural strength, that more of a high density metal such as aluminum density 2.7 can be incorporated than can a hydride such as decaborane density 0.78.

The metal containing-fuel particles include metals, alloys and metalloids and solid hydrocarbons such as lithium hydride, boron carbide, naphthalene, and generally may comprise from about 25 to 85 percent by weight of the total solid fuel composition. Again, the preferred range of the metal-containing particles is about 60 to 80 percent by weight of the total weight of the fuel, the balance of the fuel being a low melting metal binder such as lithium together with, preferably, a small amount of a combustion conditioning agent, if the fuel additive does not have the desired conditioning properties.

The metal containing fuel particles which are bound up with a metal binder according to the present invention may comprise high heat releasing, exotic metal and metalloid particles such as magnesium, lithium, carbon, aluminum, boron, beryllium, or even titanium in their simple form or after hydrogen and heat treatment. Also any of their alloys which have desirable fuel characteristics and their carbides, borides and hydrides including low energy hydrides such as sodium borohydride potassium borohydride, sodium hydride and potassium hydride and including high energy hydrides of high energy metals such as decaborane, aluminum hydride, lithium hydride, magnesium hydride, beryllium hydride, lithium borohydride, lithium aluminum hydride, beryllium carbide, lithium carbide, aluminum carbide, boron carbide, silicon carbide, aluminum boride, naphthalene, polytetrafluoroethylene, etc.

In general, the hydrocarbon materials including organic polymers such as fluorinated polyethylenes and monomeric hydrocarbons such as naphthalene and starch are provided to produce large volumes of gaseous products of combustion for rocket applications. Polyethylene also is suitable polymer.

In the present description and in the claims, the term metal-containing fuel particles is intended to embrace both metal and metalloid particles. The metal-containing fuel particles generally should be finely divided, i.e., have an average particle diameter of about 5 to 150 microns and preferably about less than 5 to 50 microns. Thus, finely divided powder of the range of finest obtainable mesh to 400 mesh is preferred in most compositions.

As previously indicated, the metal bound fuel slugs of the present invention usually provide their outstanding results when they contain preferably from about 10 to 20 percent by weight of the total fuel composition of a combustion conditioning agent and/or ignition sensitizer. The ignition sensitizing agents improve ease of ignition of the fuel or propellant or renders it pyrogallic or pyrophoric and the combustion conditioning agents promote more rapid, vigorous combustion by dispersing the fuel particles into the oxidizer stream to give good mixing, rapid flame spreading and combustion and high burning rates when desired. The preferred combustion conditioning agents of the present invention are the metal hydrides such as aluminum hydride, lithium hydride, decaborane, beryllium, hydride, lithium borohydride, aluminum lithium hydride of which lithium hydride is outstanding for high temperature decomposition requirements and all the others i.e. economics permitting are excellent for low temperature decomposition requirements, that is for fuels demanding high combustion rates.

Thus 10% of lithium hydride in lithium will give a burning rate of about 0.1 inch per second in a suitable high temperature oxidizer stream but 10% of lithium aluminum hydride will give 0.5 to 0.7 inch per second burning rate under similar conditions. The factor being the decomposition temperature of the hydride.

Suitable sensitizer and conditioning agents of the fuel type are decaborane, lithium hydride, phosphorus, lithium and the carbides and hydrides of aluminum, boron, carbon, i.e. naphthalene, anthracene, polyethylene, etc. The ignition sensitizer or combustion agent component of the oxygen and fluorine containing type may be heavy plastic coated particles of R.D.X. (trinitrotrimethylenetriamine) or pentaerythritol tetranitrate or any solid nitrate, chlorate, perchlorate, both inorganic and organic, or any solid nitro or perchloro compounds such as ammonium nitrate, ammonium perchlorate, hydroxylamine nitrate, hydrazine nitrate, hydrazine dinitrate, hydrazine perchlorate, trinitro toluene, picric acid, lithium nitrate, lithium chlorate, lithium perchlorate, nitro starches, nitro cellulose, nitro guanidine, urea nitrate, quaternary amine perchlorate, guanidine perchlorate, erythritol tetranitrate, double and multiple based cordite type composition, fluorine containing solids such as polytetrafluoroethylene, polymers of vinyl fluoride, vinylidene fluoride and hexafluoropropylene and all fluorine rich hydrocarbons (solid) and fluoroethers.

Some of the above listed sensitizers and combustion agents may be used as all or part of the fuels. Those which are suitable as fuels include hydrides of aluminum, boron and preferably lithium. Cellulose nitrates, containing generally 11 to 13 percent nitrate, can be incorporated in useful amounts as combined fuel-oxygen sources. Most of the other explosive based combustion promotion and flame spreading agents are too explosive and hazardous to use as fuels in other concentrations than up to 10%. But the above named low energy oxidizers i.e. chlorates and perchlorates and fuels may be used as the only combustion conditioning components of propellants which are extruded and burned as auxiliary power supply sources, as long as the extrusion rate is greater than the burning rate. Stoichiometric ratios of these oxidizers coated with plastic films can be incorporated in fast in situ burning rocket propellant.

As in the case of metal containing fuel particles, generally finely divided particles such as in the range of 100 to 400 mesh and preferably 325 to 400 mesh, provide the best results.

Excellent solid fuel bound with a metal or metal alloy, which preferably contain a combustion conditioning agent or sensitizer, may be made according to the following formulation:

TABLE I

| Ingredients | Parts by Weight | |
|---|---|---|
| | General Range | Preferred Range |
| Metal binder such as lithium, magnesium or magnesium aluminum alloy | 10–90 | 20–60 |
| Fuel particles such as magnesium, aluminum, lithium hydride decaborane, etc. | 5–90 | 60–80 |
| Combustion conditioning agent such as lithium hydride, lithium borohydride, etc. | 5–60 | 10–30 |

For torpedo applications, the preferred fuels are magnesium and aluminum particles bound within a lithium binder. The general and preferred ranges of the solid fuel compositions are given in Table II below:

TABLE II

| Ingredients | Parts by Weight | |
|---|---|---|
| | General Range | Preferred Range |
| Binder (lithium) | 10–40 | 20–30 |
| Fuel (magnesium particles) | 20–80 | 40–60 |
| Combustion conditioning agent (lithium aluminum hydride) (magnesium hydride) | 5–20 | 10–15 |

The above solid fuel formulation provides outstanding results in an underwater torpedo engine of the fully condensing exhaust type. The fuel is particularly effective when end burned or extruded into a combustion chamber with stoichiometric ratios of hydrogen peroxide and sea water is used as a chamber temperature moderater only, although good results are obtained with other oxidizing agents such as a solution of magnesium or lithium perchlorate in sea water or quantities of cast coated lithium perchlorate embedded as axial fusible cores in the slug. As it will be pointed out hereinafter in more detail, lithium perchlorate can be supplied in the form of cast solid sticks or as simple crystals which are usually continuously dissolved in sea water and the sea water solution and lithium-bound solid fuel slugs burned to provide an excellent water-reactive fuel oxidizer mixture, for either stoichiometric or non-stoichiometric combustion requirements i.e. condensing or non-condensing exhausts.

Another outstanding solid fuel slug for torpedo applications under fully condensing conditions in which the exhaust of the engine is condensed and pumped overboard for constant speed performance regardless of depth, is the following compositions:

TABLE III

| Ingredients | Parts by Weight | |
|---|---|---|
| | General Range | Preferred Range |
| Binder (lithium) | 10–40 | 20–30 |
| Fuel (aluminum particles) | 20–85 | 40–60 |
| Combustion conditioning agents (lithium hydride) lithium aluminum hydride | 5–20 | 10–15 |

The above compositions provide excellent solid fuel compositions particularly when burned stoichiometrically with an oxidizing material such as hydrogen peroxide, perchloryl fluoride, superheated sea water solution of $LiClO_4$ or embedded cast solid lithium perchlorate.

For high speed torpedoes in which no propeller is used to drive the missile, outstanding solid fuel mixtures, which are readily burned with water vapor or steam, are found in the following table:

TABLE IV

| Ingredients | Parts by Weight | |
|---|---|---|
| | General Range | Preferred Range |
| Binder (lithium) | 10–40 | 20–30 |
| Fuel (magnesium particles) | 20–70 | 40–60 |
| Combustion conditioning agent (cellulose nitrate or magnesium hydride) | 5–20 | 10–15 |
| Lithium perchlorate (plastic coated) | 5–70 | 10–20 |

Mixtures containing magnesium are usually reacted with a combustion conditioning medium, upstream of the water or steam injection said medium being hydrogen peroxide, aqueous solutions of lithium borohydride, aqueous solutions of metallic oxysalts such as lithium perchlorate, lithium nitrate or magnesium perchlorate and/or conventional solid propellant charges or cordites.

These serve to ignite, or keep ignited the fuel-steam or water mixture.

In another aspect of the present invention, outstanding solid fuel compositions for airborne rocket engines were prepared by using a lithium binder which provides a thrust 10 percent greater than that obtained by conventional systems. Preferred lithium-bound rocket fuel compositions are found in the following table:

TABLE V

| Ingredients | Parts by Weight | |
| --- | --- | --- |
| | General Range | Preferred Range |
| Binder (lithium) | 10–60 | 30–50 |
| Fuel (aluminum or boron carbide or polytetrafluoroethylene particles) | 10–70 | 30–50 |
| Combustion conditioning agent (lithium hydride, decaborane, or cellulose nitrate) | 10–40 | 15–30 |

The above lithium bound rocket compositions may be advantageously burned with hydrogen peroxide, perchloryl fluoride, liquid oxygen, liquid fluorine and other well known oxidizing and fluorinating materials as are well known in the art.

In all the above fuel compositions and particularly in the rocket engine fuel compositions, lithium hydride or other combustion conditioning agent may be replaced in whole or part by a plastic or resin coated oxidizer material which may be ammonium nitrate, lithium perchlorate or an explosive such as R.D.X. In accordance with the present invention, the oxidizer or explosive material is coated with a thin tough plastic film to prevent reaction prematurely between the fuel and the oxidizer particles. The film also cuts down the tendency for the fuel and oxidizer to deteriorate because of hygroscopic activity. While thin $1/10$ to 1 mil. plastic films are preferred, relatively thick (1 mil. to 10 mils.) coatings may also be used. In the case of rocket engine fuel where lithium hydride is dispersed in a lithium matrix such as shown in Table V, the weight of an oxidizer such as ammonium nitrate or lithium perchlorate can be generally 50 to 66 percent and preferably 10 to 90 percent of the total weight.

In preparing the solid fuel composition of the present invention, it is important that certain steps be followed in order to get uniform dispersement of the fuel particles within the metal matrix. Thus, the present invention provides an efficient method of preparing a solid fuel by mixing powdered lithium and a powdered fuel such as magnesium or aluminum or these alloys with preferably some lithium hydride or other combustion conditioning agents in a vacuum or a hydrogen or inert gas atmosphere. The mixed metal, fuel, and combustion conditioning agent particles are then heated if permissible, but not essential, to a temperature below the melting point of the lithium but to a temperature at which it is flowable under reasonable pressure, and thereafter the heated mixture is conveniently pressed or extruded into shape to form a solid fuel slug in which the fuel particles and the metal hydride particles are bound together by the lithium. It has been found that tumbling the metal particles such as magnesium, aluminum and the lithium alloys in hydrogen gas at high temperature but below the decomposition temperature of their respective hydrides and preferably at high pressures improved their combustion properties.

In accordance with the present invention, the heated mixture may be formed by pressing under pressure say 500 pounds per square inch or more, or by extrusion into the form desired. When the mixtures are not heated, pressure up to 25,000 p.s.i. may be required for some compositions. The present invention also provides a concept or preparing a solid fuel slug by mixing the powdered fuel particle and combustion conditioning agent such as powdered boron carbide and powdered lithium hydride with a metal binder material which may be magnesium, aluminum or magnesium-aluminum alloy or a magnesium-lithium alloy or in aluminum-lithium alloy, or a lithium-aluminum magnesium alloy and thereafter pressing the powdered mixture to form the same. Thereafter the pressed mixture is sintered to form a solid fuel slug at close to the fusion temperature of the binder as in the powder metallurgy practice and art, and also by using techniques as used in powder metallurgy. The metal mixture such as boron and borides etc. may be pressed and sintered to give 5 to 30% open porous structure and vacuum impregnated with lithium hydride above 760° C. or porous sintered magnesium, aluminum, lithium alloys may be vacuum impregnated with fused lithium borohydride decaborane and other hydrides of lower melting point in the same way.

In still another aspect of the present invention the shape of the propellant or solid fuel slug is of some importance. For example, one aspect of the present invention provides an improved fuel by preparing a slug with an outer core of metal hydride particles dispersed in a matrix of lithium. Disposed within such outer core is an inner core of a lightly pressed weak crumbly mixture of 60–95 parts by weight of a metal such as boron and 5–40 parts by weight of lithium hydride or other hydride or carbide.

Outstanding results can be obtained with a metal bound solid fuel composition by forming a laminated propellant in which thin sheets of the lithium bound fuel particles are alternatively laminated and cemented by plastic films (polyurethane resin) to sheets or disks of solid oxidizer material or else sheets or disks of material which contains a plurality of oxidizer particles bound together with a lithium or a suitable organic binder. With the above described laminated propellants in which the metal bound fuel is incorporated in layers, rockets can be made which are capable of obtaining 10% greater thrust than existing rockets. In the rocket engine, the lithium binder is valuable because it has a high energy, low molecular weight, a low density and good structural characteristics which are the requirements of a fuel and a binder. The lithium can bind a lot of fuel particles or metal hydride and even stoichiometric ratios of plastic coated oxidizer particles within its matrix. This provides the rocket fuel with some good advantages over conventional propellants.

In accordance with the present invention, nuclear rocket fuel can use as high as 90 to 95% of lithium hydride as a fuel. In this case, the lithium binder, having the lowest molecular weight of any metal, is also suitable as a fuel. However, it is preferably present only in 10 to 20% by weight to lower the slug melting point although as low as 5 and as high as 40 may be desirable in some applications, particularly, when some of the vaporized, superheated products of the fuel pass through the nuclear reactor and used thereafter burned with a suitable oxidizer in a chemical hybrid version of a nuclear rocket engine. Magnesium and even aluminum may be included as a heat release medium in chemical hybrid formulations, the magnesium and aluminum selectively forming stable oxides and leaving the lithium free to function as propellant vapor.

As to the ram-jet application of the present metal-bound fuels, it is well known that boron and aluminum and boron carbide are desirable fuels from the energy release and density standpoint. Advantage is taken of the use of free ram air to burn aluminum and boron particles which are dispersed uniformly within a matrix of lithium, phosphorous, magnesium or alloys of lithium with magnesium and aluminum. If the slug is made by a sintering process, the matrix can be magnesium, a magnesium-aluminum alloy, a magnesium lithium alloy, and an aluminum lithium alloy, or a metal hydride, preferably lithium hydride.

Suitable ram-jet fuels are noted in Table VI which follows:

TABLE VI

| Ingredients | Parts by Weight | |
| --- | --- | --- |
| | General Range | Preferred Range |
| Lithium (binder) | 5-20 | 10-15 |
| Aluminum particles (fuel) | 40-90 | 60-70 |
| Lithium hydride (combustion conditioning agent) magnesium hydride | 5-60 | 10-25 |

Alternatively sintered porous fuel slugs of boron can be vacuum impregnated with lithium hydride or sintered porous fuel slug of magnesium, aluminum and their lithium alloys can be vacuum impregnated with low melting point hydride such as lithium borohydride and burn in situ as ram-jet engine combustion chamber liners simultaneously protecting the engine while providing some fuel.

As a summary of ram-jet fuels, excellent solid fuels for fusion and combustion chamber injection or for in situ burning as illustrated in the figures of the ram-jet drawings to follow, which may contain a combustion conditioning agent or a sensitizer, are made according to the following formulation:

TABLE VII

Ingredients— Parts by weight
  Binder: Lithium, preferred or magnesium aluminum, boron, phosphorous or lithium hydride _____ 30-40
  Metal or metalloid particles (generally 100 to 425 mesh such as 325 mesh aluminum or magnesium hydride, lithium hydride.) ___ 50-70
  Combustion conditioning agent such as penta erythritol tetranitrate or R.D.X. (sym-trimethylene trinitramine) lithium hydride, or decaborane _____ 0-10

It also, has been found that oxidizer particles that would ordinarily react prematurely with metal or metalloid fuel particles such as lithium perchlorate and lithium hydride particles, unexpectedly can be safetly placed in close proximity to metal hydride particles when said oxidizer and/or fuel particles are coated with a thin but sometimes thick (.5 to 5 or 6 mils.) polymerized resin film such as a film or epoxy resin. The resin film prevents premature reaction of the oxidizer particles with moisture or metal hydride particles so that even 2 or 3 times as much oxidizer as would ordinarily be tolerated can be added in its coated form. Heavy organic coatings are permissable and desirable both from the safety point of view and to provide $H_2$, $H_2O$ and $CO$ gases from airborne rocket propulsion since the metals usually produce solid oxides which do not contribute thrust. While oxidizer particles alone may be covered with a plastic film, when certain fuels are used such as lithium hydride with lithium perchlorate, both fuel and oxidizer particles may and should preferably be coated.

As previously discussed, the metallic bound-solid fuel compositions of the present invention may be used advantageously in an alternative propulsive fashion, that is, in inertial propulsion, when hydrogen gas generation is required to produce buoyancy in an underwater vehicle that is normally too heavy and sinks in water. By means of this overweight and a means of more than correcting it by gas displacement of ballast the vehicle can be made to alternately rise and sink vertically or by using steering vanes to follow a sinusoidal up and down glide path through the water. Hot or cold gas may be used and even cheap auxiliary gas sources such as acetylene from the hydrolysis of calcium carbide or hydrogen from the hydrolysis of the fuels may be used or the exhaust hydrogen from non condensing propulsion engine cycles burning the metal fuels.

As previously stated the metal bound fuel slugs are exceptionally useful in a wide variety of propulsion systems and are of particular advantage when used in water burning torpedo engines and air burning ram-jets when high reactivity is required or as propellants in final rocket stages. As shown in FIG. 1, the metal-bound solid fuels are adaptable for use in an underwater torpedo engine or in an airborne rocket engine. FIG. 1 shows a rocket 5 having a forward propellant containing portion 6 and a rear combustion and exhaust portion 7 which may or may not feed an engine (piston or turbine). The forward portion 6 includes chamber 8 containing a solid fuel 10 having a plurality of metal fuel particles 11 uniformly disposed within a lithium metal binder 12. In the embodiment shown in FIG. 1, the composition comprises 27 parts by weight of 325 mesh aluminum powder and 8 parts by weight of lithium hydride and 35 parts by weight of lithium binder. The fuel slug may or may not carry a single or multiple solid core of plastic film coated ammonium nitrate oxidizer. It is preferred that the slug 10 contains a plurality of plastic coated ammonium nitrate particles 13 in the amount of 85 parts by weight. The fuel 10 is extruded by a piston 15 through a die 16 into a combustion chamber 17 where it is burned with perchloryl fluoride to provide a high heat and energy release at a slow-to-fast-enough and yet controllable rate to be effectively utilized in propelling the rocket 5.

The combustion of the solid fuel slug containing plastic coated oxidizer particles may be illustrated by the following equation:

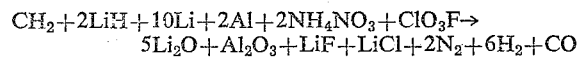

$$CH_2 + 2LiH + 10Li + 2Al + 2NH_4NO_3 + ClO_3F \rightarrow$$
$$5Li_2O + Al_2O_3 + LiF + LiCl + 2N_2 + 6H_2 + CO$$

In accordance with the present invention, the improved solid fuel is easily extruded into the combustion chamber to form relatively thin tubes 19 which provide a high surface area for combustion of the fuel. The heat is fed back from the chamber through the die for use in fuel fusion or softening. Throughout the extrusion step, the metal-containing fuel particles remain uniformly dispersed for more even burning.

The piston 15 is forced against the fuel slug by a burning propellant charge 22 which can be cordite, a smokeless powder which is a mixture of nitrocellulose and nitroglycerin or other monopropellant. The propellant 22 causes pressure to be exerted against the piston 15 as well as pistons 23 and 24 which in turn pressurize a liquid combustion agent 25, $ClO_3F$ (perchloryl fluoride). The $ClO_3F$ is stored in an annular chamber 25a around the fuel chamber and conducted to the combustion chamber by conduits 26 and rupture disk 27 into a cooling jacket 28 which is located around the combustion chamber. The liquid $ClO_3F$ is injected into the combustion chamber through a series of slits 30, which as shown in FIG. 2, are radially disposed around the inner periphery of the combustion chamber near the entrance of the extruded sleeve 19 of the lithium-bound fuel.

As seen in FIG. 2, the die is in the form of a multiple holed generally circular shield with a central bulging conical section 32 and an outer peripheral section 33 which is circular in outline and concentric about the central section 32. The plurality of thin tubes 19 form a thin burning surface just outside the die where they are contacted by the $ClO_3F$.

To start, a thermit charge 35 is set off by the same electrical signal as is used for propellant charge 22. The thermit mixture 35 operates as an initial fuel softening and as an ignitor for the metal-bound fuel/perchloryl fluoride system, a small bleed hole 36 being provided in the die 16 for the bleeding of the products of combustion of the thermit mixture.

FIG. 3 shows an underwater torpedo engine system 37 which may be a 12″ diameter underwater vehicle in which a metal bound fuel slug 39 first is fused or softened over its total diameter, locally at the leading edge and burned with steam or any other oxidizer. A fusible metal-bound metalloid fuel slug which consists of 50% lithium 40 and 50% by weight of lithium hydride 41 is moved by a fuel pressurizing piston 42 which is in turn initially driven by a fuel pressurizing starting spring 43 until a fuel pressurizing fluid inlet 44 delivers gas or pumped sea water to further pressurize the piston 42.

In the embodiment shown in FIG. 3, a fuel cell end cover 45 provided with seals 45a, is disposed within a metal fuel cell 46 which is reinforced by an annular fiberglass plastic reinforcement layer 46a.

In accordance with the present invention, the fuel slug 39 is loosely disposed within the cavity 46 and the cavity 46 narrows towards its rearward portion into a thin-necked fluid fuel extrusion unit 47. The slug 39, when fused enough to be flowable, by heat, is fed for combustion by the piston 42 through die 48 into a combustion chamber 54 to form a thin extruded sleeve 49 where it is burned with steam and superheated sea water which is injected therein by water injection units 50. The steam and sea water, which may be conditioned by $H_2O_2$ injection or aqueous $LiBH_4$ solution is combined with the fused sleeve of metal bound fuel which is extruded to form a continuous, relatively thin burning surface. The sea water is fed to the injectors by means of cooling loops conduits 52 which encase the combustion chamber and cool the same. At the same time, the sea water is superheated and should contain free steam for reliable combustion. The coolant water inlet 53 takes the form of a long conduit of which there is usually four, each of which include a conduit section 52 and the combustion chamber outlet is a conduit 55 which may be used to provide heat distribution to the thin-necked section 47 as well as to provide energy for propelling the vehicle. Usually, there are 4 outlets 55.

When the underwater torpedo system is started, a supply of hydrogen peroxide can be introduced temporarily into inlet 53 so that the engine may be started on decomposed hydrogen peroxide before the sea water is introduced. In this case, a hydrogen peroxide decomposer 56 having an entrance conduit 17 to line 53 would be required along with a storage vessel 58 from which liquid hydrogen peroxide 58a could be forced into the decomposer 56 by nitrogen under pressure. The decomposed products of hydrogen peroxide are then injected into the combustion chamber 54 and burned therein. The hydrogen peroxide combustion provides heat for the initial fuel fusion. Also, it burns with a thin extruded sleeve 49 to continuously heat up the combustion chamber and fuse the fuel and enable further running on superheated sea water alone as the oxidizer for the extruded metal sleeve 49. After the engine is started, a valve 59 is provided which cuts off the flow of $H_2O_2$ and enables sea water to enter the conduit inlet 53. The sea water 59a is brought in through strainer 60 and water pump 61 to the valve. Also, when first starting the engine, in order to get combustion chamber temperature up to a range of 2300° F. for fuel fusion and combustion water superheating, a thin hollow cylindrical sleeve of lithium-bound fuel as shown in phantom and comprising 50% lithium hydride and 50% lithium may be disposed within the combustion chamber. This thin walled slug is quickly burned up by the peroxide decomposition products, in fact this fuel acts as a decomposer and reacts spontaneously with hydrogen peroxide and its burning would provide a high temperature to heat up the combustion chamber walls to fuse the fuel slug in contact with the same and superheated the water for quicker and smoother changeover and more vigorous combustion of the main extruded fuel.

FIG. 4 shows an alternate embodiment of a means of supplying a thin metal burning surface to the combustion chamber 54 to be burned therein with sea water. As seen in FIG. 4, a shaft driven pump 62 is provided to force a thin metal burning surface into the combustion chamber to form a thin pencil or sleeve 63 thereof. The screw pump or Moyno progressive cavity pump 62 comprises a plurality of blades 64 screw mounted on a central shaft 65. This arrangement reduces the piston and fuel cylinder pressurizing requirement somewhat.

FIG. 5 shows a fully condensing steam, closed cycle torpedo propulsion system utilizing a metal-bound slug according to the present invention. The system shown in FIG. 5 is a metal-based, highly thermo dynamically efficient combustion system which features a high energy fuel and combustion essentially by sea water as an inexpensive oxidizer. The sea water is used as principal oxidizer to power a fully condensing, closed loop steam propulsion cycle. The fuel slug, demonstrated in this outstanding torpedo propulsion system, is one of 30% by weight of lithium (as a binder), 60% 325 mesh magnesium particles uniformly dispersed therein as well as 10% lithium hydride.

Again the metal bound fuel slug is extruded into the combustion chamber and burned with an oxidizer, and in this case steam. In accordance with the present invention the steam is produced by regeneratively heating sea water and delivered to the combustion chamber in the maximum quantity compatible with the combustion maintenance and stability in such a manner as to retain control over the reaction rate. In the torpedo engine system 70 shown in FIG. 5, an annular chamber 71 containing hydrogen peroxide 71a is disposed around an inner fuel chamber 72 comprising a metal slug 72a, 73 containing a lithium binder 74 and fuel particles 74a therein. The fuel slug 73 is extruded through a die 75 into a combustion chamber 76 where it is burned principally with steam 77 which is injected therein at 78. Again a thin extruded sleeve 79 of fuel is formed beyond the die 75 and is important in maintaining and producing smooth and reliable combustion.

The solid fuel is pushed along on its path toward the combustion chamber 76 by hydraulic pressure from a piston 80, the piston 80 pushing the slug against the fusion and extrusion die 75 at the opposite end of the fuel chamber. As seen in FIG. 5, sea water 81 is brought into a pump 97 through inlet 82 and is eventually forced into a chamber 83 behind the piston to pressurize the same. As also noted, a spring 84 aids in pushing the slug forward when the engine is started.

A quantity of hydrogen peroxide is used for starting and a smaller quantity for combustion maintenance. Hydrogen peroxide is delivered via a silver gauze filled catalyst decomposer 75b, which also serves as an integral mounted fuel fusion unit to annular slit type injectors 78 concentric with the combustion chamber 76. The solid fuel combustion starting core extending through the extrusion die 75 in the form of a sleeve 79 ignites in the hydrogen peroxide, at a suitable rate to generate enough heat for further combustion of the slug with the injected sea water. The combustion of the solid fuel sleeve 79 with an oxidizer mixture comprising about 10% by weight of hydrogen peroxide 71a and 90% by weight sea water 81 in about stoichiometric ratio on the fuel produces intense steam raising heat.

Initially, the engine is run on $H_2O_2$ alone to heat up the forward edges of the fuel slug and to heat up the combustion chamber 76. In starting the engine, nitrogen 87 under pressure forces hydrogen peroxide 71a thru the decomposer 75b and into the combustion chamber to burn therein. A by-pass valve 88 is opened to allow the $H_2O_2$ to enter the decomposer without traveling a path thru the normal pumping system used when the engine has reached running speed.

The heat produced by the initial burning of the solid sleeve 79 preheats the die 75 so that the temperature of the slug is near, or above, the melting point of the lithium binder. Thus, after the initial extrusion further advancement of the sleeve 79 into the combustion chamber is facilitated by the lubrication of the soft-to-molten lithium binder.

Once the lithium bound fuel is softer and somewhat preheated, the injected decomposed hydrogen peroxide reacts with the fuel sleeve producing spontaneous ignition. The combustion exhaust from this reaction further preheats the combustion water. Preheated sea water 81 is introduced at injector 78 and replaces the hydrogen peroxide there to the greatest percentage possible with the system design. The combustion then is maintained by the semi-solid sleeve of the slug and the superheated sea water and steam with the minimum of hydrogen peroxide required for reliable combustion.

In discussing the chemistry involved in the combustion initiation and maintenance, the hydrogen peroxide is carried in an amount of about 5%–20% of the sea water required for stoichiometric combustion, that is combustion in which all the oxygen in both the peroxide and injected water and the fuel are burned to produce metal oxides hydrogen and heat.

The equations for the steam oxidation (sea water) are as follows:

$$2Li + H_2O \longrightarrow Li_2O + H_2 + 9{,}600 \text{ B.t.u./lb. (fuel only).}$$

$$2LiH + H_2O \longrightarrow Li_2O + 2H_2 + 5{,}800 \text{ B.t.u./lb.}$$

$$Mg + H_2O \longrightarrow MgO + H_2 + 5{,}600 \text{ B.t.u./lb.}$$

The products of combustion from the reaction of sea water and the lithium bound fuel slug are passed through a steam boiler system which comprises boiler 83 having boiler tubes 89 therewithin, the shell being located integral with and enveloping the combustion chamber 76. The boiler 83 also comprises a steam superheater 91 through which the products of combustion pass. The products are then exhausted to sea around an oxidizer water feed recouperator coil 93, the coil being in the exhaust outlet 94. As much heat as is technically practical being removed from the gases.

In the fresh water steam boiler system 83, steam raised in the boiler passes through a steam chest 95 and through the superheater 91 into a piston type engine or turbine 85 which, in turn, drives the pumps 97, 98, 99 and 100 and auxiliaries in the torpedo engine system.

The speed of rotation of engine 85 having a hollow shaft 100a is measured by a tachometer 101 for control purposes.

In the embodiment shown in FIG. 5, the steam turbine or engine 85 exhausts into a three stage annular condenser 103, the steam condensate 103a collecting in a sump 104. The condensate 103a is returned by the engine driven pump 99 to the first stage of the condenser for preheating and then to the boiler 83 where it is spray injected against the upper outer side of the combustion chamber 76 for both the combustion chamber cooling and rapid evaporation requirements. The lower part of the boiler being filled with the water which fails to evaporate immediately on injection.

The condenser 102 is cooled in three stages for increased cycle efficiency. First, at the high temperature end the condenser 85 is cooled by the boiler feed water line having a series of holes 105a for injecting the water over the combustion chamber shell to cool the same. In the second stage the condenser is cooled by water being pumped for fuel combustion along feed line 105b, and in the third stage the condenser is cooled by cold sea water 81 circulated through lines 107 to maintain the condenser operation at the designed pressure level. Thus in the engine cycle just described, the cycle is a closed one in which steam at high temperature and high pressure is used. The cycle has good efficiency since much of the heat released in the condenser is returned either to the boiler 85 or the combustion chamber 76.

Thus in the present embodiment shown in FIG. 5, a metal fuel composition which burns with free sea water with very high heat release is utilized without embarrassing the engine with high back pressures at depth due to non condensable and non soluble gaseous products. The products of combustion are directed to sea through the exhaust outlet 94 where the solids are either dissolved or dispersed.

The combustion shown in FIG. 5 is essentially magnesium and lithium in steam. The combustion is satisfactory over any pressure range so that the combustion pressure may rise with the depth that the torpedo engine is operating in, a range of 0 to 2500 feet generally being operable. Even a great depth as high as 2000, 2500 feet or more will not interfere with the combustion efficiency, and the performance of the closed loop steam cycle is, likewise, unaffected. This system, then, provides a great advantage in being able to dive deeply without greatly decreasing performance of the combustion sytem and, or, without decreasing performance of the engine cycle.

The engine speed of the torpedo is controlled by heat rate which in turn is controlled by electrically actuated by-pass valve 108 on the fuel presurizing line 109 and a by-pass valve 110 on the hydrogen peroxide feed line 111.

The system shown in FIG. 5 may provide a power level of better than 5 lbs. of fuel per H.P./hr. and this power level is completely independent of depth of the water as previously described.

Another advantage of the engine is the fact that little oxidizer is carried in the system, so that the usual oxidizer space generally can be used to carry extra fuel. In this respect, the fuel density is about 1.2 grams/per cubic centimeter, and the high fuel to carry oxidizer ratio is favorable for this type of torpedo system and compensated for the extra space consumed by hardware used as the condenser.

Thus, the combustion chamber pressure and temperature can be varied by the $H_2O_2$ and the mass of water injected. A core of conventional solid ammonium nitrate based propellant can be used in this system to replace the $H_2O_2$ as combustion conditioning agent. Water injection being used for fuel combustion as before but a slug burning rate of 0.1 inch sec. is obtained. However the water technique can be used to control the fuel combustion rate. Since the solid propellant core burning rate is both temperature and pressure sensitive, and can be fed at controlled rate and combustion can be regulated accordingly, about 0.05–0.1 inch per second for normal propellants.

FIG. 6 shows the adaptation of a metal-bound fuel in a fully condensing exhaust torpedo propulsion system 119. As in the case of FIGS. 1, 3 and 5, the fuel slug is utilized by extrusion. As therein illustrated, a fuel slug 120 comprising a lithium binder 121 with finely divided metal particles 122 dispersed uniformly therein (preferably 200 to 325 mesh aluminum powder) is utilized to provide a relatively high specific thrust by extruding the fuel 120 into a combustion chamber 123 and burning the same with steam and oxygen which are supplied as decomposition products of hydrogen peroxide and by sea water injection. The fuel slug encases a single or number (subject to torpedo diameter) of cast solid rods of lithium perchlorate which provides about half the oxygen requirements of the fuel, and which don't interfere with the combustion rate.

The fuel, which for best results is about 70 parts by weight of the above described aluminum particles, 20 parts by weight of lithium and 10 parts by weight of lithium aluminum hydride, is carried in a fuel storage chamber 124. A lithium perchlorate core 125 may be disposed within the fuel slug in an amount of 140 parts per 100 parts of the fuel. Liquid hydrogen peroxide 126 is carried in an annular coaxial storage chamber 127 around the fuel chamber 124 and pumped by means of pump 128 through a conduit 129 on the entrance side of the pump to a conduit 130 having a check valve 150 and a by-pass throttle valve 151 which is moved into a decomposing chamber 131 on the exit side of the pump which chamber contains a silver catalyst for decomposing the peroxide.

The torpedo generally has three main sections, (1) a propellant carrying section containing the fuel slug 130, solid oxidizer core 125, and liquid hydrogen peroxide 126 (2) the combustion chamber 123, and (3) a power section which has a hot gas engine 132 and a hollow shaft 133 with an interior central opening 134 therein running longitudinally the length thereof which serves as hot gas engine exhaust conduit, and the drive shaft for a propeller 135.

In first starting the torpedo, nitrogen, under pressure in a storage chamber 136, is released by an electrically operated valve 137 to apply pressure to the liquid hydrogen peroxide in its storage chamber 127, there previously being no pressure therein greater than atmospheric. When pressurized, the peroxide flows via the electrical operated starting valve 138 into the decomposer 131 and is decomposed and injected into the combustion chamber, the engine 132 rotates, at this stage being driven by the hydrogen peroxide decomposition products alone, which also serve to provide the initial fuel fusion heat at the forward portion of the fuel slug. A fuel pressurizing spring 139 starts the fuel extrusion piston 140 moving and commences the now, softened fuel injection.

As the engine section is operated the shaft 133 is rotated which in turn drives various pumps, etc. One of the pumps, the liquid $H_2O_2$ pump 128 begins to deliver hydrogen peroxide at controlled rate to the decomposer chamber 131. Also, a pump 140 is started which takes in sea water 141 at a filter 142 and forces it through line 142a into a space 143 behind the presently spring loaded piston 140 which forces the lithium-bound fuel into the combustion chamber also at a controlled rate. The fuel is extruded through a die 144 in the form of a relatively thin sleeve 145 which forms a burning surface which rapidly and energetically disperses and mixes when the fuel sleeve intercepts the oxidizer stream coming from annular-spaced injectors 146 and combines spontaneously with the decomposition products of the hydrogen peroxide.

In the embodiment shown in FIG. 6, the fuel slug has a central cavity running longitudinally along its entire length. A rod 125 or multiple plastic coated rods of an oxidizer material is disposed in said cavity and is extruded along with the fuel through a central opening 147 in the die 144 into the combustion chamber to decompose and to provide additional oxygen for the fuel combustion stream. The rod 125 is solid lithium perchlorate and is used in amounts of 140 parts by weight per 100 parts by weight of the solid fuel 130.

As shown in FIG. 6, the valve 138 which is an electrically operated valve, is provided to get the peroxide to the combustion chamber under nitrogen pressure before the liquid pump is started. After the engine driven peroxide pump 128 is started, the by-pass valve 148 can be used to control the rate of the hydrogen peroxide being supplied to the combustion chamber. Also as shown in FIG. 6, a third pump 149 takes sea water from the filter inlet 142 and delivers it through conduit 150 and into a chamber regenerative cooling coil 151 from where it is injected into the combustion chamber by annular injectors 152 to drop the chamber gas temperature so that the products can be admitted to the engine at about 2300° F. or lower.

The exhaust gases from the engine are passed to an annular condenser 153 where they are first cooled by a combustion chamber water injection preheater coil 154 and then finally condensed in multiple curtains and streams 155 of cold sea water in a contact condenser 153 as shown. The combustion products condense as solutions of lithium oxide, hydroxide and chloride and the aluminum oxide forms an insoluble slurry in a condensate sump 154. The condensed slurry-solution is pumped overboard by an exhaust pump 155. Any non soluble hydrogen and oxygen resulting from temporary non-stoichiometric combustion or from associated water, is either catalytically or spark recombined to be condensed to join the flow in the sump as shown or the non soluble gases may be cooled, compressed, diluted with water from the water injection line and returned to the combustion chamber at no real power penalty.

The equations for the desired stoichiometric combustion are as follows:

$2Li+H_2O_2 \rightarrow Li_2O+H_2O+6,210$ B.t.u./lb.
$2LiAlH_4+6H_2O_2 \rightarrow Li_2O+Al_2O_3+8H_2O+3,800$ B.t.u./lb.
$2Al+3H_2O \rightarrow Al_2O_3+3H_2O+5,900$ B.t.u./lb.
$8Li+LiClO_4 \rightarrow 4LiO_2+LiCl+6,220$ B.t.u./lb.
$2LiAlH_4+2LiClO_4 \rightarrow Li_2O+Al_2O_3$
$\phantom{xxxxxxxxxxxx}+4H_2O+2LiCl+3,850$ B.t.u./lb.
$8Al+3LiClO_4 \rightarrow 4Al_2O_3+3LiCl+6,000$ B.t.u./lb.

None of the diluent water is theoretically burned, the practical power output being about 5 lbs. per H.P./hr. The system efficiency is also depth independent which is of great advantage.

FIG. 7 shows a torpedo engine 155 which burns a metal-bound fuel slug in steam. In accordance with the present invention, advantage is taken of the fact that lithium and magnesium burns effectively and vigorously in steam and that certain percentages of metals which will not burn in steam but do so in the presence of burning lithium and/or magnesium. An engine casing is shown having a fuel chamber 156, a combustion chamber 157 and a nozzle 158 which leads to a turbine or other propulsion engine device. A fuel slug 159 comprising magnesium powder particles 160 and a lithium binder 161 therefor is extruded into the combustion chamber by means of a die 162, being forced therethrough by a piston 163 in a manner similar to the engine system described in FIG. 5.

The embodiment shown in FIG. 7 discloses a novel means of cooling the combustion chamber as well as effectively producing steam for the combustion of an extruded fuel sleeve 164 which is fed through the die 162.

As shown in FIG. 7, sea water 165 is brought aboard the vehicle through an inlet 166 and into a conduit 167. From conduit 167, the sea water is sprayed into a steam chest 168 through multiple spray injectors 169. The sprays 169 are fed from a common inlet over the top of the combustion chamber to spray cool the chamber. As also seen in FIG. 9, the steam 170 resulting from coolant evaporation, develops pressure and is injected into the combustion chamber through a series of steam injecting slots 171 disposed radially around the outer periphery of combustion chamber 157. The water which does not turn to steam falls and collects in the lower half of an integral boiler combustion chamber 172 as a condensate 173. The condensate 173 is forced by the steam pressure through passageway 174 into an annular chamber 175 from which it is injected into the combustion chamber proper by a series of injector slots 176 disposed around the periphery of the chamber wall 177. The water in the lower half of the boiler 172 is held at a constant level by evaporation and concentration by contact with the hot combustion chamber wall which turns the water to steam. The concentrated sea water is auto pressurized by the steam production and thus is injected into the combustion chamber 157 as a superheated concentrated salt water solution.

The superheated salt solution provides secondary combustion of the fuel to aid the primary combustion between the fuel sleeve and the steam. The injection of the salt solution also helps lower the combustion chamber temperature.

The primary oxidizer, the steam, moves from the steam chest 170, which is of a horse collar shape and located over the top of the nozzle end of the combustion chamber 157, through an upper passageway 179 into an annular passage 180. The steam is injected from the steam carrying annulus 180 into the combustion chamber by a series of steam injector openings 171 which may be spaced evenly about the periphery of the combustion chamber wall 177 at the steam injecting point.

As is shown in phantom in FIG. 7, the steam chest may be provided with an outlet 182. Steam may be bled from the outlet for engine propulsion or, as shown in dot-dash lines, it may be returned after driving the engine to the combustion chamber 157 at a lower pressure by means of a long conduit 183 for directing the steam into the hollow die 162 and injected at the slot type injectors 184, also shown in phantom, for burning with the fuel sleeve 164.

About 10 to 25% by weight of aluminum up to 80% of magnesium particles (200 to 400 mesh) in a lithium binder therefore can be burned in steam in this combustion system. As previously described also other preferred torpedo fuels may be used in this combustion system.

FIG. 10 shows a rocket-torpedo engine 185, which engine is suitable for launching into the air from a ship or airplane. The engine 185 is initially rocket propelled and then is adapted to enter the water to hunt a submarine or other targets under water. The engine 185 has an auxiliary turbine power section 187, an oxidizer section 188, a propellant section 189 and a nozzle section 190. Disposed within the propellant section 189 is a combustion chamber 191 in which there is an in situ-burning fuel slug 192 of generally cylindrical shape with an end-located igniter 193. Also within the slug 192 is a cylindrical hollow convention propellant composition 194. There may be a single inner propellant lining 194 or there may be two or more co-axial cores to serve as the propellant for the airborne rocket operation.

Also, within the combustion chamber for use before take off, are electrical wires 195 used to set off the thermit ignitor 193.

In the embodiment shown in FIG. 10, the fuel slug 192 comprises a plurality of lithium aluminum hydride and magnesium particles 196 and a lithium binder therefore 197. The propellant slug 194 also comprises a lithium binder 198 and dispersed therein are aluminum powder particles 199 and lithium perchlorate oxidizer particles 200 which have a tough relatively thick plastic film 201 to encase the same so as to prevent their premature reaction or deterioration from the action of any moisture present.

In launching the torpedo-rocket engine 185, the propellant slug 194 provides the thrust while the vehicle is in the air. The fuel slug 192, then in turn, is burned with steam as an oxidizer when the vehicle runs under water.

In accordance with the present invention, the conventional solid propellant 194 launches the vehicle. A turbine 202 of the auxiliary power unit is started, the gas passing through filter 203 in a turbine feed line 204 so that the turbine runs on filtered gas from the combustion chamber. The rocket motor burns out and the vehicle drops in the water at a predetermined place.

Sea water 206 is taken aboard the vehicle through a filter 207 and a combustion chamber coolant coil 208 where it passes into a chamber 209 containing lithium borohydride in a plastic gauze basket 211. The lithium borohydride is dissolved in the sea water to the maximum concentration which is generally about 20%, and the solution 212 resulting therefrom is pumped to the combustion chamber, by means of a pump inlet line 213, and pump 214, and combustion chamber feed line 215 having injectors 216 therein. The solution reacts spontaneously with the lithium and is used to oxidize the fuel slug 192, after which combustion and propulsion proceeds. Gas is bled off from the combustion chamber for the turbine device as stated before starting or restarting the turbine 202 when the vehicle enters the water may be accomplished by cordite cartridge 202a.

As shown in FIG. 10 the sea water 206 for use in preparing the lithium borohydride solution 212 is pumped through conduit lines 208 which pass around the skin of the torpedo. This arrangement of the lines 208 serves as a chamber coolant by-passing the water over the propellant chamber and hot nozzle section of the combustion chamber 191. Alternatively cheaper and more soluble sodium borohydride or even potassium borohydride may be used. The solution of lithium borohydride in water is then injected into the combustion chamber 191 through the spray injectors 216.

The above described vehicle, then, can obtain high speeds say, 60–150 knots for short distances under water, to be able to successfully overtake high speed vehicles including nuclear submarines.

Another combination air and water vehicle 217 is shown in FIG. 11, the engine system being of the rocket-propelled type which propels itself both through the air and water at high speeds. In the engine system 217, there is provided a fuel slug 218 comprising metal-containing fuel particles 219 which are preferably lithium aluminum hydrides and magnesium powders dispersed within a lithium binder 220. There may be also some plastic coated cellulose nitrate particles dispersed therein. Also adjacent the fuel slug 218 at one end thereof is a short cylindrical slug 221 of a conventional propellant material, the function of which will be explained later.

An inner liner 222 is disposed within the fuel core 217 and used therein as a propellant for rocket flight. The cavity 222a within the hollow core 222 is the combustion chamber zone or chamber. The slug 222 is another fuel slug which comprises a lithium binder 223 and has metal-containing fuel particles 224 dispersed within the binder. The particles preferably are aluminum and lithium hydride.

A cell containing 90% $H_2O_2$ (225) and an expandable pressurizing bag 226 is carried at the forward end of the combustion chamber. Nitrogen 227 under pressure is carried within a pressure bottle to pressurize the bag 226 and feed the $H_2O_2$ into the combustion chamber.

In launching the vehicle 217 the hydrogen peroxide is delivered to the combustion chamber 222a by nitrogen pressure through pipes 228 and 229, by a pump 230 which is driven by a turbine 231. The turbine, which also runs on hydrogen peroxide, exhausts by line 232 into the main burning chamber 222a of the vehicle. The turbine 231 is run on hydrogen peroxide (226) fed by nitrogen pressure to the turbine decomposer 231a. The rocket motor operates until a time switch or radio signal cuts the peroxide flow.

A pressure sensitive valve 233 operates when the vehicle leaves the air and enters the water. The hydrogen peroxide flows only to the auxiliary turbine 231 and its decomposer 231a.

The sea water flow commences, being supplied by the former peroxide feed pump which has been disconnected by valve 233. The sea water 235 enters at a filter 236 and regeneratively cools a nozzle 238 and a combustion chamber 222a by picking up heat while traveling through a cooling loop 239 and conduit 240 to arrive at pump 230. Further describing the path of the sea water, the water passes through the pump 230 and is sprayed into the combustion chamber by injectors 241.

Water from the pump now replaces the peroxide feed 241 to the metal fuel containing decomposer 242 which auto pressurizes the peroxide chamber 225 through bag 226.

As shown in FIG. 11, the sea water injected spray passes through the central cavity of the rather short slug 221 of previously ignited conventional propellant material which may be an ammonium nitrate-organic polysulphide rubber composition having a 0.1 inch per second burning rate and having about the same cross sectional shape as the fuel slug 218.

FIG. 12 shows an underwater torpedo engine system 242 which has a high energy fuel and a condensible exhaust. In FIG. 12, the fuel is in the form of a slug 243 which is a mechanical mixture of 10% by weight of lithium hydride and 60% by weight of magnesium powder particles 243a in a lithium binder 243b. The solid slug 243 is carried within a fuel storage chamber 244.

The torpedo propulsion system also has a combustion chamber 245.

In accordance with the present invention, the fuel just described is burned in the chamber 245 with a solution of lithium perchlorate in sea water. Sea water 246 is brought in through the electrical inlet valve and filter 247 to an annular solid oxidizer chamber 249 around the fuel storage chamber 244.

Illustrating the techniques of making an oxidizing solution as the torpedo runs under the water, the sea water 246 is passed into the chamber 249 where it is brought into contact with cast sticks or crystals of solid lithium perchlorate 250 to thereby provide a solution 251 of the same in sea water. Although not shown in FIG. 12, sea water may be preheated by passing it along the combustion chamber and condenser coolant loops to thereby facilitate the dissolving of the lithium perchlorate and more easily make solutions in larger concentrations.

The fuel slug 243 is then burned with the lithium perchlorate solution 251 which has been pre- and superheated by using it as a regenerative cooling fluid for the combustion chamber and condenser to thereby provide outstanding performance for propulsion. The solution 251 is brought to the combustion chamber by pipe 252 into an annular chamber 253 having injectors 254 on its inner wall adjacent the combustion chamber. The products of combustion are passed through a gas driven propulsion engine 255 which has a hollow shaft 256 having an interior central opening 257 running longitudinally the length thereof. This shaft serves as the hot gas engine exhaust and a center drive shaft for a contra-rotating propeller 258.

In first starting the torpedo, nitrogen, under pressure in a storage chamber 269 is released to apply pressure to a monopropellant 270 such as liquid hydrogen peroxide to provide fuel for start up. Previous to the release of the nitrogen the system has no pressure other than atmospheric. When pressurized, the monopropellant 270 flows by a starting valve 271 into the liquid injection chamber 253. When hydrogen peroxide is used it is decomposed and injected into the combustion zone. The decomposition of the hydrogen peroxide preheats the fuel and fuses it so that it can be passed to the engine. The engine 255 at this stage is now driven by the monopropellant alone.

As the engine section is operated on the shaft 256 it is rotated and which, in turn, rotates the various pumps and auxiliaries, namely pump 273, 274, 275 and 276. In driving the pumps a gear box 276a is driven which in turn rotates at a reduced r.p.m.

As shown in FIG. 12, a progressive cavity type fused fuel pump 277 mounted on a shaft 278, and aided by a screw driven fuel pressurizing piston 278a is used to press the liquified fuel into the combustion chamber for burning. The fuel pressurizing shaft 278 may be hollow and the exhaust gases may be conducted from the combustion chamber through the hollow shaft to a point in the chamber 279 behind the piston 278a for fuel auto pressurization if desired.

The fuel slug 243, thus, is extruded through a die 285 in the form of a relatively thin sleeve which forms a burning surface which rapidly disperses and mixes when the fuel sleeve combines spontaneously with first the decomposition products of hydrogen peroxide and then later with the superheated solution of lithium perchlorate and sea water. The extrusion first is accomplished by heat when the slug is fused by heat from the hydrogen peroxide decomposition through plate 285a.

As shown in FIG. 12, the valve 271, which is electrically operated, is provided to get the peroxide to the combustion chamber under nitrogen pressure before the engine and perchlorate solution pump 276 is started. The peroxide cell is also auto-pressurized from the combustion chamber. After the combustion is started, the perchlorate solution pump 276 delivers the solution to the combustion chamber via the preheater coil 276a and the combustion chamber wall coolant loop 253 and this solution gradually replaces the peroxide flow at the injectors. The electrically operated by-pass valve 260 can be used to control the pressure and rate of the feeding of the perchlorate solution being supplied to the combustion chamber and acts as the engine and torpedo speed throttle.

Also shown in FIG. 12, a third pump 273 takes water from inlet filter 273a and delivers this for the purpose of condenser cooling, for combustion chamber regenerative cooling 261 and injection 262 to drop the chamber temperature so that combustion products can be admitted to the engine 255 via conduits 263 at about 2300° F. or any other desirable temperature.

As seen in FIG. 12, the engine 242 is provided with a condenser 286 which encases the combustion chamber and engine section and has an upper condenser 287 and a lower sump 288 having a condensate level therein awaiting exhaust overboard by pump 275 and exhaust conduit 275a. Sea water is passed to the condenser through a conduit 289 and is injected by spray openings 290 in tubes 291 of the contact stage of the condenser as a fine curtain type spray which finally condenses the exhaust steam which, in turn, deposits with its solids in the sump 288. Water from pump 273 feeds line 291 as well as a second condenser stage 293 where it is preheated on its way to the combustion chamber 245—via chamber coil 261 and injectors 262.

Gas compressor 274 takes in any condensable gases from the condenser and after precooling them, compresses them and, after dilution with water at valve 264, reinjects them into the combustion chamber at 265.

In the case of torpedo systems using closed steam cycles, semi-closed stoichiometric fully condensing or non stoichiometric combustion that is lithium, magnesium and the hydrides in superheated water and steam and with a minimum of combustion conditioning oxidizer as in the cases previously listed, and when good performance at depth and high back pressures is desired, then it is found that a good increase in performance for minimum equipment volume is obtained when cold sea water is injected into the cylinders of the propulsion piston engine over the latter half to quarter of the piston displacement during expansion and during all the possible time during the compression stroke that is operating the engine as a condensing steam engine, when the liquid solution and any gas content may be discharged directly, or alternatively passed to the cylinder space behind the piston in a double action engine for identical treatment. The piston and the rear portion of the cylinder being used as a combined condenser and discharge pump. Actually in the case of gas water mixtures these may be passed to a small contact condenser separator and the solution pumped overboard and the gas separating in the top of the condenser cooled, compressed and returned to the combustion chamber if combustible or discharged overboard or delivered to the expandible buoyancy bag for inertial propulsion by a single or two stage compressor.

Alternatively inertial propulsion can be used if a combustion torpedo system as related in FIG. 6 can be used for propulsion and a heavier than water vehicle dropped in the general area of a suspected target to be silent but listening at a fixed depth say 2,500 ft. When the vehicle hears the target, the engine starts and exhausts hydrogen gas from the engine, it being pumped into water—displacing buoyancy bags to give a faster rising rate and helping the engine until the desired target depth is reached. When reached, the gas is vented to correct the buoyance.

In still another propulsion system for underwater vehicles such as torpedoes, mines, decoy submarines and even small submarines, the solid fuel slug of the present invention is reacted with water to produce hydrogen gas for inertial propulsion of an underwater vehicle 300.

In FIG. 13, a fuel slug 301 is utilized in the underwater vehicle 300 to inertially propel the same. The inertial propulsion is accomplished by alternatively trapping and releasing the hydrogen gas produced by the fuel slug within the vehicle. The trapping of the gas within a chamber inside of the vehicle provides a great upward buoyant force, while releasing the gas from within the vehicle provides a downward sinking force.

The fuel slug 301, used for inertial propulsion engines, is preferably a lithium-bound fuel composition comprising 80 to 90 parts by weight of metal hydride (preferably lithium boro-hydride) particles 302 and 10 to 20 parts by weight of a lithium binder 303, although other metallic binders such as magnesiums, lithium alloys and other previously described suitable metallic materials may be used. The above described fuel composition is used within a gas generator unit 303a, the details of which will be explained later.

The reaction of the metals lithium and magnesium and any of the light metal hydrides in steam represents the best method of extending the range of a torpedo when this is run at or above a depth consistant with the exhaust pressure of its engine.

Hydrogen gas is produced for example by the reactions i.e.: $2H_2O + LiBH_4 \rightarrow LiBO_2 + 4H_2$ or $3H_2O + 2AlH_3 \rightarrow Al_2O_3 + 3H_2$.

Lithium borohydride is the most efficient hydrogen generator and under the conditions described generated 0.368 lb. of hydrogen per lbs. of lithium borohydride. The compound releases 5,930 B.t.u./lb. of energy some of which may be recovered electrically.

For long endurance at depths down to 2,500 ft. the only method to exploit the water reactive properties of the fuel is to use the hot hydrogen gas evolved on sea water hydrolysis to more than compensate for the sea water which is allowed to enter the vehicles ballast tanks for submersion as in a submarine. Thus, first by concentrating all the electronics into a more reasonable space than is at presently done. Balancing their location and converting the available air space in the torpedo body into an expandable rubber bag, containing ballast tanks. When launched the ballast tanks fill and assisted if desired by a weight suitably attached under the nose; the torpedo would rapidly sink and by applying steering power in the normal way to control direction and angle of descent the vehicle could search noislessly on battery operated electronics for the target in this case an enemy submarine at whatever speed the design permits. While reaching the maximum depth of search; gas generated by means of the water reactive fuel, i.e. by allowing water to flow in a controlled amount, under pump pressure into the fuel cell by a non return valve, or alternatively by filling the cell under sea pressure via a non return valve, and then firing a cartridge of the reactive fuel into the water from a revolver type mechanism. The gas resulting is used to inflate the expandable rubber bag displacing the water from the ballast tanks and the vehicle rises. The vehicle can be made to sink and rise repeatedly.

When a target is located, the vehicle displacement is automatically corrected for depth, the power plane starts and the vehicle attacks in accordance with usual design practice.

It is obvious the torpedo need not steer or follow a search path while listening for the enemy. It can just ascend and descend repeatedly, the purpose being to listen for the enemy in all layers of water since sometimes different layers make it difficult to listen.

This vehicle could be designed to search for 24 hours or several days in an area where a submarine was sitting the assault ships out (on the bottom). Instead of the elastic bag, a metal container containing an elastic bag or piston, and of any suitable shape can be attached to the vehicle for the purpose above and located in the best position. This container could carry the fuel, the hydrogen producing mechanism and depth cycling mechanism.

It could be made independent of the torpedo electrically and no electric connections would be required.

Electricity required for powering the electronic and operating elements could be produced economically by a small drag driven generator of the paddle wheel type having its blades exposed to the sea axially with the vehicle, or even from the reverse rotation of the propellers, drag driving the electric motor as a generator at low power over this period, in the case of an electric torpedo. However it is possible to use the hydrogen generating fuel as the consumable electrode in a sea water battery. The hydrogen is evolved as before but electrical power is derived also.

It is usable for pulling mines to the surface and for raising A.S.W. sonar buoys from listening positions on the sea bed off shore to carry these aloft in the air to enable them to radio their data to shore A.S.W. stations or air craft.

It is also practical for small manned submarines and even large ones to be operated the same way. A very heavy density say 3.0 for down and 0.3 for up with internal ballast water displacement and a larger bag may be used. Internal elastomeric bags should be used to line or be contained in all submarine ballast tanks as a routine protection against tank rupture and failure under explosive shock. The bag would be unharmed and the water could be displaced from the tanks irrespective of tank damage and the submarine could always surface. The gas producing fuel slugs above, thus are usable as emergency gas source in case of compressed air failure.

As seen in FIGS. 13, 14 and 15, the underwater vehicle 300 shown is an anti-submarine homing torpedo. The torpedo 300 has a warhead 304, a transducer 305, a hydrogen gas producing section 306, a inertial buoyancy section which carries an expandable elastomer bag 308 which, in turn, is wrapped around the forward end beginning at the warhead 304 and ending on the forward side of the after-transducer 305.

When the vehicle is launched or air-dropped into the sea, a sea water-power supplying battery is activated which is preferably the fuel slug 301 just described, it being usable as a battery source as well as a fuel source. The bag 308 is collapsed tightly against the hull of the vehicle and the vehicle made very negatively buoyant if necessary by flooding a ballast tank, 310 through open vents 310a. The vehicle sinks rapidly to the maximum depth of suspected target operation, following a circular glide path and listening for the enemy. When the predetermined maximum depth has been reached and no target detected, a depth sensing element 311 is activated and transmits a signal of suitable duration to a valve 312, which seals a supply of compressed gas (nitrogen or hydrogen) in the gas generator cell for use during the start cycle. The compressed starting gas flows along line 314, 314a into the bags 308 and 327 and inflates them to the desired dimensions. The valve 312 then closes. The vehicle becomes positively buoyant and begins its glide path "ascent." The desired dimensions of the bag 308 which would tend to increase and overspeed the vehicle and even burst the bag as the water pressure decreased, is held constant by a pressure and depth sensing element 315 whose output is passed through a valve 316 which partially opens during ascent to compensate for this. Now, the vehicle 300 is rising, circling and listening for the target. When the minimum preset depth has been reached by the vehicle and still the target is not detected, the dive or descent valve 316 is fully actuated by the output of the shallow or "descent" depth sensing element 315. The valve 316 opens fully and the gas is displaced by the water pressure on the bags out via the valve 315 and a small engine 317.

The bag 308 is now a tight fit around the hull and bag 327 is collapsed, the vehicle is again negatively buoyant and sinks rapidly going through the previous search cycle. The "descend" valve 316 closes.

As previously stated, the gas exhausted from the bags 308 and 327 is passed through the small engine 317 where it does useful work for the system. It drives a small pump 319 which recovers a good percentage of the exhaust gas, compresses it and passes it back to the gas generator 303a via a non return valve and ignitor 321 until a pressure differential sensor 323 passes a signal to valve 325 which interrupts the flow by switching it to the sea, the gas going to sea at outlet 326 and the pump 319 takes a stream of water 327 in at filter 328 and delivers water instead of gas to the gas generator 303a instead via a feed line 330, and injector 321 where the water 327 reacts with the fuel slug 301 to produce hydrogen gas until the desired and predetermined generator pressure is built up. Then the second level output of the pressure sensing switch 323 operates valve 324 and permits the "by-pass" of the water and its flow back to pump intake.

The gas economizing device is made more efficient and reliable if a sea water and drag-driven turbine with skin exposed vanes, is coupled to the same shaft. The drag driven turbine (not shown) provides propulsive power for the pump when no gas is being displaced and may also serve to drive a small electrical alternator which supplies all or part power for the valves, steering and guidance electronics.

When maximum depth has been reached and no target still detected, the depth sensing element 311 actuates valve 312 as before, and gas inflates the bags 308 and 327 and the positively buoyant vehicle 300 rises as before. The sinusoidal depth and circular search pattern is repeated until the target is detected, or a time self distruct device destroys the vehicle or until the gas producer fuel is all used.

If and when the vehicle detects a target down at depth below the torpedo, the bags 308 and 327 are vented by the valve 312 by means of the guidance signal 326 fed directly to it, and the bag 308 collapses against the skin. At that time, then, the vehicle is of suitable density, the motor is actuated and the torpedo is capable of homing on the target in the usual way. If the detected target is above the torpedo, then the bags are filled with gas.

Insofar as hydrogen gas generation for inertial propulsion of underwater vehicles is concerned, instead of the hydrides being used, the hydrolysis of the light metals fuel slugs can be used. For instance, fresh water reacts slowly with sheets of lithium, magnesium, lithium magnesium and lithium aluminum alloys and much more rapidly if these metals have been hydrogen treated at about 100–200° C. and under pressure — 1,000 p.s.i. or higher or preferably have some metal hydride mixed therein. The gas production rate is increased if the water is sea water and that the reaction rate increases with temperature. But the most rapid gas evolution is possbile if the metal slugs 301 are made with cathode in a battery type arrangement with the largest surface to metal volume ratio and are connected electrically to an iron, copper, silver or other more electro negative element immersed in the gas generator in the form of a wire gauze 333 or which is the container and is insulated from the gas producing metal. As shown in FIG. 14, separators 334 are disposed between the fuel plates 301 and gauze 333.

All the lithium, magnesium, and aluminum boundfuel formulations are excellent for the above described gas-producing purpose. The compositions containing lithium hydride and lithium borohydride, as previously indicated, are the best hydrogen producers although other hydrides such as lithium and lithium aluminum hydrides can be used.

As seen in FIG. 14 the battery comprises plastic fuel cell compartments 336, each of which contain one fuel sheet 301, two wire gauzes 333, and two plastic separators 334. A lower inlet opening 338 and an upper outlet opening is provided in each cell 336. Water from inlet 321 flows up into the cell through opening 338, while hydrogen gas generated by the reaction of the water with the fuel 301, leaves the cell through outlet 339.

FIG. 16 shows a ram-jet engine 360 which supports a missile 361 which in turn carries a fuel 362 comprising finely divided aluminum particles 363 dispersed in a lithium matrix 364 for the engine 360. The engine comprises an exhaust port 365, an inlet 366, a combustion chamber 367 and a forward portion 368 which houses a fuel injection means 369 comprising a central tube 370 with short conduits 271 branching therefrom with fuel discharge openings 372 therein to provide good cross sectional area coverage and an outline similar to a Christmas tree.

As also shown in FIG. 16, a flame holder 380 is located downstream from the fuel injector 369 and near the juncture of the combustion chamber 367 and the forward portion 368 of the ram-jet engine. The flame holder comprises a series of annular rings which expose the open side of a V-shaped cross section to the front of the flame. Other designs for preventing the flame from traveling back and forth in the air stream can be used as is well known in the ram-jet art.

Means comprising a screw pump 383 having a central shaft 384 and blades 385 is provided for moving the fusible fuel 362 from a storage chamber 388 in said missile 361 with the aid of a piston 389 to the injector means 369. The fuel, which preferably contains 70 parts by weight of high energy releasing metal-containing powder particles 363 such as aluminum or boron, 10 parts by weight of lithium hydride and 20 parts by weight of a lithium or even phosphorous binder, is extruded by the action of the screw driven piston 389 and forced down through delivery tube 390 to the fuel injection means 369. There, the fuel is injected into the combustion chamber and burned with ram-air coming into the chamber through the entrance port 366.

In the embodiment shown in FIG. 16, the piston 389 includes a disk 395 of generally circular cross section which is a snug fit inside the chamber 388. The piston disk 395 can move with respect to the walls of chamber 388 but does not rotate therein, it being keyed to the upper wall and held against rotation thereby.

As seen in FIG. 16, a shaft 398 is extended on one end of the central shaft 384 and runs the entire length of the fuel cell. The shaft 398 is provided with threads 399 by virtue of which the piston, being internally threaded, rides forward due to the rotary motion of the shaft 398. The shaft 398 rotates in end bearing 400 and is driven relatively slowly through a gear box 401 by a turbine 402 which rotates at a relatively high rate.

In the embodiment shown in FIG. 16, the missile and ram-jet engine is launched by a solid booster, not shown. Once in flight, the ram-jet engine 360 is started by the simultaneous ignition of a propellant cartridge 403 which starts turbine 402 and the pressurization of a liquid monopropellant 405 such as n-propyl nitrate in a storage chamber 406 by nitrogen 407, under pressure, in a suitable storage tank. The monopropellant 405 is forced through conduit 409 into pump 404 from which it is pumped through exit line and bearing cooling coil 410 and from there into the propellant injector for burning.

An annular, generally doughnut-shaped auxiliary combustion chamber 412 is provided into which the monopropellant is injected and burned. The monopropellant may or may not be further burned with air which enters the combustion chamber 412, through an air scoop 415. The products of combustion pass through feed line 416 into the turbine 402 from where they may be exhausted through conduit 417 into the diffuser just forward of the fuel injectors.

The annular auxiliary combustion chamber 412 has a rearward side wall 418 which is adjacent the front of the fuel slug and which fuses or melts said slug on its forward end by conduction. The fused fuel slug is thus ready for pumping to the fuel injector means.

FIG. 16 also illustrates the use of a carbon or boron metal bound slug 419 which is used as a combustion chamber lining and burned insitu rather than extruded and burned. The insitu slug preferably comprises some finely divided decaborane fuel particles 420 and a boron binder 421. The slug 419 is mounted internally within a combustion chamber of the ram-jet engine and burns slowly therein protecting the chamber metal wall until consumed.

A ram-jet engine 422 is shown in FIG. 17. A fuel slug 424 comprising finely divided particles 425 of aluminum and aluminum or lithium hydride bound in a lithium metal matrix 427, shown located within a combustion chamber 429 being internally disposed and held there by braces 430 and 431. Each of the braces 431 has a hollow cavity 431a which serves as an exit conduit for the escape of ram coolant air which serves to cool these support structures and is afterwards burned. The ram-jet engine 422 also has an inlet 432 with movable inlet seal 433 enabling the engine to be operated from take-off as a rocket with the seal closed. The combustion chamber is thus used to contain the solid propellant booster. Upon reaching a suitable speed, the inlet area seal 433 is designed to be opened to introduce ram-air and subsequently operate the engine as a ram-jet engine. Thus, during its ram-jet operation, ram air enters through the inlet 432.

An oxidizer, which is usually 90% $H_2O_2$, is carried within the engine for use when the engine is operated as a rocket for take-off. The engine is provided with an oxidizer supply chamber 435 which carries a supply of liquid oxidizer 436 which is forced by gas pressure out of chamber 436 into a decomposer ring 437 and then injected at 438 to be subsequently burned with metal fuel slug in the present invention.

As shown in FIG. 17, a collapsible bag 439 may be provided in the chamber 435 for peroxide pressurization.

In ram-jet operation, the ram air enters the nozzle and burns with the fuel slug, the fuel slug 424 being forced through the opening 440 by piston 441. The piston 441 initially is pushed against the metal slug 424 by a spring 442 and, then a monopropellant 443, which is burned to provide gas to help extrude the fuel slug. In any event, during both the rocket and the ram-jet flights, the fuel slug 424 forms a cone shaped burning surface 444 for efficient combustion with the metal fuel slug.

As previously indicated, each of the braces 431 comprises a coolant vent by virtue of the hollow conduit 431a. As shown in FIG. 17, part of the ram-air flows down a coolant duct 446. The ram air, in the present ram-jet engine shown in FIG. 13, thus is an oxidizer and a coolant fluid for the combustion chamber.

A solid fuel lining 447, which preferably comprises a sintered boron matrix 448 impregnated with lithium hydride particles 449 uniformly dispersed therein, may be provided to further increase the ram-jet performance of the engine. The lining also serves as a good insulating layer around the fuel cell and near the outer skin of the vehicle, a great deal of heat being required to fuse and burn off the liner 447.

FIG. 18 shows a propellant in the form of a slug 450 which is cylindrical in shape. The cylinder 450 comprises a strong outer core 451 comprising fuel composition of lithium hydride particles 452 bound within a lithium matrix 453. Disposed within the outer core is an inner core 454 which is weak and crumbly for fast burning. In a core 454 preferably comprising about 90% powdered aluminum and about 10% lithium hydride or aluminum hydride although weak crumbly fast burning mixtures may be used such as 90% boron or boron carbide powder and 10% lithium hydride powder. Also the inner core may contain a solid oxidizer core such as cast lithium perchlorate or a loosely packed mixture of propellant such as oxidizer particles and metal particles including boron, boron carbide, aluminum, magnesium and lithium and/or the hydrides of these. The slug 450 is useful in the applications where high heat release and fast burning rates are needed. And, also when oxidizer is included, in applications where it is difficult to initiate or maintain combustion of the main fuel core 451 under such conditions as extreme altitude operation when rarification of the atmosphere 120–150,000 ft. result in low chamber pressure, high stream velocities and oxygen starvation of these extreme altitudes.

FIG. 18 also shows how a convention solid propellant thermit mixture or solid oxidizer may be incorporated to assist starting and fusing, and/or burning or provide oxidizer for the solid slug when it is reacted with ram air and without peroxide starting as in a simple engine such as FIG. 17.

FIG. 19 shows the use of fuel having metal-containing particles bound with a low melting metal matrix in a nuclear rocket engine 461. The engine 461 comprises preferably a plurality of fuel carrying chamber 462, each of which contains a fuel slug 463. The fuel slug comprises 80 parts by weight of LiH particles 464 disperse in 20 parts by weight of a lithium binder.

Also shown is a nuclear reactor 495 comprising a plurality of axial tubes 496 of tantalum, molybdenum, columbium or tungsten with a fissionable material 497 as matrix for holding the tubes 496. Thus the fissionable material 497 is disposed between and around the interconnected tubes made of the above metals and maybe contains plutonium, uranium 235 or their alloys as solid carbides. A high temperature chamber 498 is provided which is formed by a continuous wall 499 of a high temperature and corrosion resistant material such as tantalum or tungsten line material. The chamber 498 also includes an exhaust nozzle 500.

In accordance with the present invention, each of the fuel slugs 463 is a mixture of finely divided lithium hydride or other suitable hydride particles and metallic lithium, the lithium hydride particles being uniformly dispersed therein. The binder, again, is an easily meltable, pumpable, extrudable metallic material and the fuel particles can be lithium hydride, or even a heavier metal such as cesium for some ion type rocket application. Also, the fuel particles may be amine or ammonium compounds, including solid and semi solid solutions of lithium in anhydrous ammonia and anhydrous ammonia in lithium, these fuels being hydrogen rich good conductors of heat from the nuclear reactor material and at the same time being readily vaporized and superheated to provide high energy and specific impulse for propulsion.

In the embodiment shown in FIG. 19, multiple pumps 501, 502 and 503 extrude and the fuel composition from the storage chamber 462 into the nuclear reactor 495. After the nuclear reactor has been started, the pumps are driven from a heat exchange coil 504 by a turbine 505 through a common shaft 506. The turbine 505 is started by ground installation means not shown and driven by hot reactor vaporized fuel gases entering its feed portion 507 of the coil 504. The hot gases are exhausted through exit line 508.

The fuel is pumped through feed lines 510 into the reactor heat exchange and fuel vaporization tubes 496. The fuel is vaporized, decomposed and superheated in the tubes and the vaporized fuel products pass through the high temperature chamber 498 and out exhaust nozzle 500 to provide thrust for propulsion.

As shown in both FIGS. 19 and 20, the nuclear reactor comprises a graphite moderator shell 512 and has a solid reflector shell 513 of beryllium which is cooled by the auxiliary heat exchanger and serves as a fuel preheater during reactor operation. It also serves to moderate and reflect neutrons back into the active material 497.

An outer jacket or layer 513a of the low density fused fuel 463 in the annular fuel cells is provided around the portion of the reactor core or case 514 which is also encased by the outer beryllium shell 513. Thus, the shell 513 further reflects neutrons and also serves as an heat transfer medium for fuel fusion.

A plurality of boron control rods 515 are provided in the reflector shell 513 and are protectively encased therein by an open-end tube 516. When operating the engine, most of the rods are withdrawn by a servo system 515a to start the engine, the remaining few rods being withdrawn just before the rocket is launched. As fuel is first fed into the tubes 496 to be vaporized, fuel is also fed into loop 504 where is is vaporized at high pressure and passed through line 507 to drive the turbine 505 as previously explained.

Also when first starting the rocket engine, a high pressure gas cylinder or a solid propellant charge 519 is burned to build up a high pressure in a pressure regulating chamber 520. A plurality of pistons 521 or expandable bags are provided at the forward end of each of the fuel chambers 462 to help extrude the fuel into the nuclear reactor. This pressure may be maintained by gases bled from a turbine bleed line during rocket operation.

If the pressure in chamber 520 is high, the pressure in the chambers 522, behind each of the pistons, is much less, being only generally about 100 p.s.i., but is enough to help push the loose metal-bound fuel into the fusion zone and feed the pumps and thus maintain the reactor feed when operating under zero gravity.

As best seen in FIG. 19, the piston 521 force the forward molten or semi-molten portion of the slugs 463 into the pumps 501, 502 and 503 by feed lines 523. The feed lines 523 are located in a hot portion of the engine and the molten fuel thus is easily maintained in a pumpable flowable state.

Thus according to the present invention, a fuel comprising solid fuel particles such as ammonium and amine compounds including ammonium carbamate, triazines, and ethylene diamine and preferably particles of lithium and lithium hydride of a size preferably less than 325 mesh or better 400 mesh and in the range of an average particle size of about 5 to 40 microns, is advantageously used in a nuclear rocket engine, where it is vaporized and superheated to provide great energy for propulsion.

Since, generally it is difficult to maintain the nuclear reactor at a temperature desired say of 2000° C. or higher, the combination of vaporizing a fuel and also after burning some of the vaporized products is advantageous used with the reactor can be maintained only at lower temperature, say of 1200 to 1500° C. A nuclear chemical hybrid rocket engine 530 is shown in FIG. 21. The engine 530 has a fuel carrying chamber 531 which contains a fuel slug 532 comprising lithium hydride 532a and a lithium binder 532b. The engine 530 also comprises a nuclear reactor 533 which consists of a plurality of co-axial fuel vaporization tubes 534, a plurality (preferably four—two of which are shown in FIG. 21) of high temperature combustion chambers 535, each of which has an exhaust nozzle 536. In addition, the engine 530 also has a plurality of pumps 541 (one pump for each quadrant of the fuel slugs shown) driven by a plurality of turbines 544. The pumps 541, thus, move the fuel into the reactor 533 by means of fuel feed system comprising relatively short tubes 545, 546 and 547 and which lead the fuel into a main header tube 548.

The molten fuel is fed into pump 541 from the header tube 548 and is moved into the reactor 533 through conduit 549. The fuel is further heated in conduit 549 and delivered through header-inlet feed 550 into header ring 551. The still molten, but superheated fuel is then forced through the nuclear engine from the header 551 by means of the fuel tubes 534 which, as seen in FIG. 22, are welded to the header 551 at the feed end and welded to another header ring 552 at the exit end. The feed tubes 534 are thus disposed between rings 551 and 552 and form a plurality of continuous connecting passageways therebetween.

Thus, the fuel is liquid at the feed end and is a vapor at the exit end. As seen in FIG. 21, each of the fuel tubes 534 has a relatively short feed end 553 and a long discharge end 554. The feed end 553 has an internal diameter that is smaller than the internal diameter of the discharge leg 554.

At the end of the feed end 553, the bore in tube 534 enlarges as best seen in FIG. 23. The liquid fuel is vaporized at the point of enlargement so that a larger cavity is used to convey the fuel to its expanded gaseous form. The velocity of the fuel travel is also greatly accelerated by the vaporization and the gaseous fuel hurtles through the enlarged bore portion 554 of the fuel vaporization tube 534.

Continuing to describe the chemical fuel tube arrangement in the reactor 533 as shown in FIG. 22, the cluster of coaxial fuel tubes 534 are fed by the ring 551 just-described and a series of three smaller diameter rings 557, 558 and 559 which are in the same plane as ring 551 and are concentric about the same center point. A series of three nuclear fuel containing rings similar to rings 557, 548 and 549 are located in the intervening sections of the reactor and are in the same plane as ring 552, and again are concentric about the same axis. In a manner similar to the arrangement of rings 551 and 552 (which are tungsten injector plates), the rings 557, 558 and 559, and their counterparts at the discharge end are intercoupled and rigidly connected and spaced apart by tube 556 which makes a rigid structural unit similar to a series of nesting squirrel cage.

The nesting squirrel cage fused nuclear fuel tubes 561 are interconnected at the header rings by passages from 566 and 564 and exit to the nuclear warhead 600 via coaxial tube 565 and valve 501.

As seen by the dotted lines in FIG. 23 showing the fuel tube 534, the cross sectional outline of the chemical fuel tube and the nuclear fuel tube is cross-shaped which form provides good heat transfer properties and is a preferred form for both.

The fused nuclear fuel distribution is provided within the reactor by a unit comprising a series of parallel columbium or tantalum tubes 561, each of the nuclear tubes 561 being disposed between the chemical fuel heat exchange tubes 534 and their rings 551 and 552 as best seen in FIG. 22 and shown by the dotted lines in FIG. 23.

The nuclear fuel tubes are supported by two parallel spiders 562 and 563, one on each end of the fuel tubes and rigidly connected thereto. A central fused fuel tube 564 which serves for fuel discharge is also provided. A pair of hubs 565 and 566 are connected to each end thereof and the whole nuclear tube unit is supported by hub 565 which is integrally mounted to framework 567.

A pipe 570 is provided outside of the fuel chamber 531 which delivers an oxidizer such as water to the interior of the vehicle 530.

The water is delivered by a set of pumps 571 which are driven by common turbine shaft 572 to the high temperature chamber 535 at a point 573 rearwardly of the nuclear reactor 533 through conduit lines 574. The water is injected as steam at 573 after serving as a nozzle coolant in cooling loop portion 575 of the conduit 574 into said chamber 535. The steam introduced at injection point reacts with the vaporized products coming from the fuel tubes 534 to provide a much higher temperature 2000–3000° C. and, thus, provides additional thrust by after-burning. When the fuel slug comprises, say, 90 parts by weight of finely divided lithium hydride particles and 10 parts by weight of lithium metal, lithium ions are produced by vaporization of the lithium hydride in the reactor 533. The steam then combines with the lithium radicals to form lithium oxide and release a very large quantity of energy which is exhausted along with the other dissociation and combustion products out the nozzle to produce thrust. Magnesium and aluminum can be incorporated in the slug for the same purpose.

In the embodiment shown in FIG. 21, as in the case of the engine shown in FIG. 19, the fuel slug 532 is extruded into the nuclear reactor 533 by means of the pumps 541, etc. where the fuel and metal binder material are dissociated to provide a large amount of energy for propulsion. Again, as was described in the engine shown in FIG. 19, a piston may be provided to force the fuel slug toward the pumps. The fuel slug 532 is preferably heated in its portion adjacent the pumps from the heat of the reactor 553, transferred by the lithium fluid.

As seen in FIG. 21, the water pump 571, in addition to supplying water to conduit 574, also supplies water to a heat exchanger 580 which is embedded in a reflector layer 581 which is preferably solid lithium 6 or lithium deuteride. The heat exchanger converts the feed water to steam which is delivered by exit tube 583 to a valve 584 which, in turn, connects to two steam lines 585 and 586. Line 585 delivers steam to the main high temperature chamber 535 through cooling chamber 575. Line 586 delivers steam to a steering rocket 590 where it is burned with fuel from coming from the fuel slug 532, via main tube 548 pump 541 and then through a control valve into feed line 592.

Thus, steam from the heat exchanger drives the turbine 544, burns the fuel for the steering rocket, burns the vaporized and decomposed products of the chemical fuel from the nuclear reactor, and also can be used to pressurize the fuel slug 432 or pressurize the water in line 570.

Thus, the engines of FIGS. 19 and 21 illustrate the use of fuel bound with a low melting metal binder (preferably lithium) but which may be nearly wholly and preferably a majority of lithium hydride powder. The fuels are extruded into a chamber for vaporization to provide a high amount of energy for propulsion.

Just as in the case of the engine of FIG. 19, the embodiment of FIG. 21 has a moderator core. The engine of FIG. 21 has a core of molten beryllium 595 in and around the nuclear fuel and chemical fuel tubes in the reactor 533. Likewise, a lithium 6 or lithium deuteride reflection jacket 596 is provided outside the reactor 533, the fuel feed tubes 546, 547 and 548 being disposed therein. Also disposed within jacket 596 are a plurality of boron control rods 597. Finally, as previously described, the reflector layer 581 is further provided around the heat exchange to reflect the neutrons. An outer layer 598 of beryllium sponge is further provided to encase the layer 581 and part of the layer 596.

The following examples illustrate the use of the solid fuels on the methods and apparatus used to burn the same according to the present invention.

Example 1

A solid fuel for pressure injection into a combustion chamber and subsequent burning thereof was prepared by mixing under vacuum 60 parts by weight of 325 mesh aluminum powder (100% through 325 mesh—U.S. Standard Screen Sizes) and 10 parts by weight of lithium aluminum hydride (325 mesh) and 30 parts by weight of finely divided (400 mesh) lithium particles. The above described homogeneous mixture was heated to a temperature of about 300° F. at which time the lithium particles were relatively soft and deformable under reasonable pressure (200 p.s.i.) enough to form a matrix for the aluminum and lithium aluminum hydride particles. The heated mixture was then extruded through a suitable die to form a cylindrical shaped fuel slug.

The lithium-bound fuel slug then was inserted into a rocket engine suitable for airborne and underwater vehicles such as the rocket engine illustrated in FIG. 1. The slug, as shown by slug 11, was extruded as illustrated in FIG. 1 and FIG. 2 into a combustion chamber such as chamber 17 and therein burned with hydrogen peroxide to produce energy for thrust in an airborne rocket.

Another slug, prepared as just described, was burned with perchloryl fluoride to provide energy for thrust in an underwater torpedo rocket as illustrated in FIG. 1.

Example 2

A solid fuel composition was made according to the following mixture:

| Ingredients— | Parts by weight |
|---|---|
| Binder (200 mesh magnesium-aluminum alloy particles containing 90° magnesium 10% aluminum 0.1% manganese) | 70 |
| 325 mesh lithium hydride particles | 30 |

In the above formulation, Dow metal G, a magnesium-aluminum-manganese alloy having a melting point of 595° C. can be used as the magnesium alloy binder material.

The above described lithium hydride and magnesium-aluminum particles were mixed under vacuum and heated to a temperature slightly below the melting point of the magnesium-aluminum alloy (595° C.) to thereby sinter the mixture and provide a solid fuel slug having the lithium hydride particles dispersed within the alloy binder.

The slug was formed into a cylindrical shape during the sintering operation by enclosing the mixture in a mold.

The resultant slug was then inserted into a ram-jet engine as illustrated in FIG. 16 and the resultant slug was burned in ram air to provide high heat-releasing combustion.

Example 3

A solid fuel composition was mixed in an inert atmosphere of nitrogen, the composition comprising 30 parts by weight of 425 mesh lithium particles, 10 parts by weight of 325 mesh lithium hydride particles and 60 parts by weight of 200 mesh magnesium particles. The mixture was heated to a temperature of about 270° F., just below the melting point of the lithium but a temperature high enough so that the lithium flows readily under pressure; and the mixture formed under a pressure of 500 lbs. per square inch in a die to form a cylindrical fuel slug.

The resultant fuel slug was inserted into a torpedo engine system of the type illustrated in FIG. 5, which is a fully condensing closed cycle steam engine. The resultant slug was extruded into the combustion chamber and burned therein with steam to evolve heat which is used to power a steam cycle and so produce an excellent deep diving torpedo propulsion system. This system operated efficiently, one outstanding advantage being that the steam engine or turbine power cycle is independent of the combustion chamber pressure and the sea pressure.

Example 4

A mixture of 30 parts by weight of aluminum hydride particles having an average diameter of 100 microns and 30 parts of magnesium was mixed with 40 parts by weight of lithium binder particles having also an average diameter of 100 microns. The mixture was heated to a temperature of 180° F. and formed into a cylindrical fuel slug by a pressure of 12,000 lbs. per square inch using a suitable die. A first slug was made in the shape of a solid cylinder while a second slug was made in the shape of a hollow cylinder.

The first slug or solid cylinder of fuel was used in a 12″ underwater vehicle engine as seen in FIG. 3. The solid cylindrical slug was extruded into the burning chamber and burned therein with superheated sea water and a small amount of H₂O₂ to produce a large amount of energy for propulsion of the vehicle.

The second hollow fuel slug was inserted into an engine as illustrated in FIG. 10, which engine functions first first as an airborne rocket and then as an underwater torpedo. The fuel slug was inserted for "insitu" burning in the combination chamber in a position as illustrated by fuel slug 192. The slug was burned with a saturated solution of lithium borohydride in sea water to propel the vehicle as an underwater torpedo.

*Example 5*

A cylindrical fuel slug was made with a hollow longitudinal cavity therein by mixing 60 parts by weight of lithium particles (400 mesh) with 40 parts by weight of lithium hydride particles (200 mesh). The resultant mixture was heated and formed under pressure to form a strong outer fuel cylinder. A weak, crumbly core was provided inside the strong outer core by packing therein a mixture of 90 parts by weight of magnesium powder (325 mesh) and 10 parts by weight of lithium aluminum hydride particles (200 mesh). A resultant fuel slug was pressed to consolidate the core of the magnesium and aluminum hydride particles and form a weak fast burning core, but one strong enough to hold together during handling before burning.

The resultant fuel slug was used in a ram-jet engine such as shown in FIG. 17. The fuel slug was extruded and burned therein with air to propel the vehicle.

*Example 6*

Mixtures was made by mixing in a vacuum the following compositions:

| Ingredients | Parts by Weight | |
|---|---|---|
| | A | B |
| Aluminum hydride | 10 | 5 |
| Lithium | 30 | 30 |
| Aluminum | 60 | 10 |
| Polytetrafluoroethylene | | 55 |

The above ingredients were heated to a temperature of about 100° F. whereupon the lithium particles, while not fused were flowable enough to be formed under pressure into a desired shape. In this example, the above heated mixtures were formed in a die into two cylindrical slugs. In one of the slugs (slug B), the lithium particles formed a matrix for the fluorinated polymer and aluminum hydride particles.

In slug A, the lithium formed a matrix for aluminum and aluminum hydride particles. A solid core of cast aluminum foil wrapped lithium perchlorate of the same length and 0.65 times the diameter of the fuel slugs was inserted and the slug repressed. The resultant slug A was burned in a torpedo engine of the fully condensing type as illustrated in FIG. 6. The slug was burned with hydrogen peroxide in quantities to provide a stoichiometric combustion, that is, to provide a fully condensable exhaust. Thus Example 6 illustrates the effective burning of a lithium-bound fuel slug with the hydrogen peroxide to provide a deep diving rapidly propelled torpedo vehicle.

Slug B was used in airborne rocket engine and burned with H₂O₂ using the engine of FIG. 1. This, Example 6 also illustrates the use of hydrocarbon material to provide a release of a relatively large amount of gaseous products of combustion as carbon monoxide and free hydrogen preferably to increase the thrust obtainable from the metal-bound fuel.

Combustion equations are as follows for slug B:

$$2AlH_3 + 1\tfrac{1}{2}H_2O_2 \rightarrow Al_2O_3 + 4\tfrac{1}{2}H_2$$
$$4Li + 2CF_2 + H_2O_2 \rightarrow 4LiF + 2CO + H_2$$
$$4Li + H_2O_2 \rightarrow 2Li_2O + H_2$$
$$Al + 2CF_2 + H_2O_2 \rightarrow AlF_3 + 2CO + HF + \tfrac{1}{2}H_2$$
$$4Al + 3H_2O_2 \rightarrow 2Al_2O_3 + 3H_2$$

For their gas producing ability, polymers containing both nitro groups and fluorine atoms as substitutents on their molecular chains are preferred since they have built-in oxidizing and fluorinating agents. Such polymers, as well as straight hydrocarbon polymers, including polyethylene or fluorinated hydrocarbon polymers such as polyvinyl fluoride, are compatible and readily dispersed within the metallic binder, i.e., lithium, containing magnesium, aluminum, boron and alloys of lithium, aluminum and magnesium which are also valuable as fuel materials.

The organic polymers, used to provide large volumes of combustion gases preferably as carbon monoxide and free hydrogen to augment and make feasible the use of the high energy exotic metal fuels and metal binders in airborne rocket engines, may be used in a wide range, say a range of 1/30 or 1/10 of the weight of the metal binder when used for combustion conditioning to as high as weight ratio of organic polymer to metal binder of 5/1 or even 6/1, when used as fuel although a weight ratio of about 0.5/1 to 4/1 is greatly preferred.

With respect to the organic polymers, some polymers, as previously mentioned, with built-in oxygen and fluorine provide advantage in many rocket applications. These gas producing additives are fluorinated polyurethanes, fluorinated polyethylenes or nitro substituted polyurethanes and nitro substituted polyethylenes or polyurethanes or polyethylenes having perchloro substituents on their main chains, or other hydrocarbon polymers having hydrogen, carbon, with or without oxygen atoms such as cellulose nitrate, and in which some of the hydrogen atoms are replaced by nitro or fluorine groups or even perchloro groups.

In one aspect of the present invention, polyurethanes, whether they are fluoro substituted or nitro substituted or non-substituted, which are made with excess isocyanate so that they have some free isocyanate end groups, are particularly advantageous in helping to bind or coat hydroscopic oxidizer particles in lithium perchlorate or reactive metal and metal hydride particles such as magnesium, lithium hydride, decaborane and aluminum hydride particles and the like since the NCO groups are highly reactive towards water and react with and destroy any moisture present before admixing the hydride during manufacture and/or absorbed during storage etc. which might otherwise deteriorate the propellant charges.

Thus, in accordance with the present invention, polyurethanes are suitable as highly adhesive metal coating materials. Polyurethanes, as is well known in the art, are made by reacting polyhydric materials such as polyethers, polyesters or polyamines containing reactive hydrogen atoms with polyisocyanates (which are preferably diisocyanates although some triisocyanates may be used).

Generally, the linear rubbery polyurethanes are formed on the molar ratio of polyether or polyester to polyisocyanate of about 1 to 1. However, as previously discussed, when the diisocyanate or triisocyanate, or mixture of the two are used in amounts in excess over a 1 to 1 ratio of mole equivalent weights, the excess isocyanate groups are present in the polymer which tend to scavenge any moisture present during storage, etc. to prevent reaction of moisture with exotic metal or metalloid particles such as lithium, lithium hydride particles etc. to deteriorate the charge prematurely. In the same way the polymer may be used to coat oxidizer particles such as lithium perchlorate and ammonium nitrate.

Another example of a material which can be used as a fuel particle and/or oxidizer particle coating material and also as gas producing agent with "built-in" fluorine is polyvinyl fluoride having a molecular weight of preferably about 100,000 to 200,000, a melting point of about 185 to 195° F. and being soluble in dimethyl formamide, butyl lactone and cyclohexanone. Copolymers of vinyl fluoride with vinylidene fluoride and hexafluoropropylene are also suitable. The particles are coated by agitation in the solution of the polymers and then sprayed into a drying tower.

Example 7

The following mixture was mixed, and formed by pressure into a cylindrical fuel slug;

| Ingredients— | Parts by weight |
|---|---|
| Lithium | 56 |
| Tetrafluoroethylene polymer | 100 |
| Cellulose acetate | } [1] 80 |
| Ammonium nitrate | |
| Total | 236 |

[1] Coated oxidizer particles.

Resultant fuel slug was used in an internal insitu fast burning application as in the slug 194 as shown in FIG. 1 which illustrates a hybrid rocket engine 185. In the rocket engine, 34 parts by weight of $H_2O_2$ were used to burn each 236 parts by weight of the above described fuel slug. These amounts of fuel and oxidizer provide carbon to carbon monoxide combustion the hydrogen content is either fluorinated or left unoxidized to effectively propel the airborne rocket.

An equation representing the combustion of the fuel slug is as follows:

$$8Li + 2CF_2 + NH_4NO_3 + H_2O_2 \rightarrow 2LiF + 3Li_2O + 2HF + 2CO + N_2 + 2H_2$$

It is to be understood, of course, that the engine shown in FIG. 10 is also suitable for a torpedo engine preferably of the non-condensing type. Thus, the solid fuel composition of Example 7 is also a good fuel for some underwater engine applications.

Example 8

The following fuel composition was mixed, heated and formed by pressure into the desired fuel slug shape:

| Ingredients— | Parts by weight |
|---|---|
| Lithium particles (400 mesh) | 28 |
| Cellulose nitrate particles (400 mesh) | 8 |
| Aluminum particles (400 mesh) | 54 |

The resulting fuel slug was used in a torpedo engine system as engine 129 shown in FIG. 5. The lithium-bound fuel slug was extruded and burned in a combustion chamber such as chamber 140 of engine 129 with hydrogen peroxide and sea water. Ten to thirty-four parts by weight of hydrogen peroxide was burned with 90 parts by weight of the above fuel composition to provide non-stoichiometric combustion. The hydrogen and solids are discharged overboard after giving up their heat content to the cycle.

Ignoring the cellulose nitrate combustion, the equation goes: (for maximum peroxide addition, 34 parts)

$$4Li + 2Al + H_2O_2 + 3H_2O \rightarrow Al_2O_3 + 2Li_2O + 4H_2$$

Example 9

An improved solid fuel slug of the following fuel composition was prepared by mixing, heating and forming under pressure and in an argon atmosphere the following particles:

| Ingredients— | Parts by weight |
|---|---|
| Phosphorous particles (100 mesh) | 31 |
| Lithium hydride particles (100 mesh) | 42 |
| Aluminum powder | 27 |

The formation of the above fuel slug was obtained using a relatively small pressure of only 50 lbs. per square inch. Further adding to the ease and convenience of making the fuel slug, the mixture was heated to only 45° C. (113° C.) which is just above the melting point of yellow phosphorous particles. As previously indicated, the phosphorous provided an excellent matrix for dispersement of the metal hydride particles.

The above fuel slug was burned effectively and stoichiometrically with hydrogen peroxide 60 parts fuel with 153 parts peroxide in a fully condensing torpedo engine such as shown in FIG. 6. Equations illustrating the desired combustion are as follows:

$$2P + 5H_2O_2 \rightarrow H_4P_2O_7 + 3H_2O$$
$$2Al + 3H_2O_2 \rightarrow Al_2O_3 + 3H_2O$$
$$2LiH + 2H_2O_2 \rightarrow Li_2O + 3H_2O$$

The above slug also can be used for the ram-jets shown in FIGS. 16 and 17 and burned in air with good performance and is pyrophoric.

Example 10

A fuel slug was made from the following composition:

| Ingredients— | Parts by weight |
|---|---|
| Lithium-aluminum alloy powder (50/50) or (20/80) | 25–75 |
| Lithium-magnesium powder (50/50) or (20/80) | 20–80 |
| Lithium hydride (lithium composition) | 20 |

The above ingredients were mixed under vacuum and pressed cold at 25,000 p.s.i. as a fuel sleeve, and wrapped with two layers of epoxy adhesive coated commercial aluminum foil on the outside. A central cavity which has a diameter of 20% of that of the sleeve is filled with an oxygen-short polymer, i.e. a polyurethane resin and with ammonium perchlorate in stoichiometric ratio and then 25% excess of aluminum powder. The mixture is solidified and cured by heating at 150° F. for 12 hours.

The slug is extruded without fusion into a one shot operation ram-jet engine such as shown in FIG. 16.

Example 11

A solid fuel slug was made in which finely divided lithium hydride particles were dispersed within a matrix of boron. The following composition was used to make a relatively porous hollow cylinder of a boron alloy suitable subsequently as a matrix for lithium hydride particles:

| Ingredients— | Parts by weight |
|---|---|
| Boron | 85 |
| Lithium hydride | 5 |

The above ingredients were mixed under vacuum and heated to 2000° C. in a furnace. The lithium hydride was decomposed and served as a blowing agent to expand the sintered boron and form an open-structure foamed cylinder.

The spongy fuel slug was impregnated under vacuum with 20% by weight of fused lithium hydride at a temperature of 780° C. to provide a hollow fuel sleeve suitable as a protective combustion resistant lining for combustion chambers such as the liner used in FIG. 16. The heat of vaporization and dissociation required to burn the hydride content of the liner drains off a great deal of heat from the combustion chamber, another advantage of the liner is that the remaining sponge is combustion resistant and has insulation properties so that the walls of the combustion chamber remain relatively cool. The sponge burns slowly, the slug thickness being selected to last the time of combustion chamber operation.

In the above example, excellent combustion chamber liners can be made with a solid boron lining for combustion resistance, a lithium-bound lining having boron, decaborane, or boron carbide particles dispersed therein and a foamed boron, aluminum or magnesium lining having decaborane, aluminum hydride, lithium aluminum hydride, magnesium hydride or lithium borohydride impregnated therein as in Example 10.

Of the metal hydrides used in the examples or described as suitable ingredients for the metal bound fuel slugs of the present invention, the best results generally are obtained with lithium hydride, lithium aluminum hydride, and decaborane. Good results are obtained from other hydrides which are listed in their order of importance, as follows: lithium borohydride, magnesium hydride, aluminum hydride, and beryllium hydride.

In addition, to the hydrides above listed, as a combustion conditioning agent in airborne rocket engines, solid hydrocarbons such as naphthalene condition the fuel slug and also provide large volumes of gas.

In all the examples used thus far to illustrate the metallic-bound fuel compositions of the present invention, other suitable metal binders or foamed matrixes may be used as previously described depending upon the requirements of the fuel. As previously discussed, requirements of the metallic bound fuel slugs generally are dependent upon its use, whether it is used in a rocket, ram-jet or torpedo engine for combustion as a fuel for fast or slow burning conditions or as a very slow burning secondary fuel used for chamber protection.

Likewise, other metal-containing fuel particles can be substituted in whole or part for those used in the examples as previously described. Similarly, other combustion conditioning agents and other organic polymers used to provide large volumes of combustion products can be used in place of all or part of the particular combustion condition agent or gas-producing organic polymer used including other plastic-coated oxidizers.

In still another aspect of the present invention, lithium metal particles are advantageously produced continuously in a relatively small diameter particle-size. The resultant particle is an excellent starting material for the metal binder used to make the improved metal-bound fuel slug of the present invention.

As seen in FIG. 24, the continuous production equipment used to make the lithium particles comprises a small metal heater 625 containing solid lithium 626 therein which is used to melt the lithium, and deliver it by displacement to a high speed agitation chamber 628 for atomizing, dispersing and solidifying fine droplets of lithium in heavy mineral oil or fused petroleum jelly (boiling point above 200° C.), said chamber 628 having an inlet conduit 629 for the molten lithium stream produced in the heating pot 625. The chamber 628 has a high speed stirrer 630 and also has an opening 631 near the lower middle portion of the chamber which is used to admit a line 632 having a heat-exchanging coil portion 633 within the chamber 628. An oily liquid 634 is pumped through the coil 633 and is preheated therein, at the same time cooling previously charged oil below the melting point (186° C.) of the lithium oil dispersion. A discharge opening 635 is provided at the upper end of the coil 633 from which the oil is ejected. At this point the temperature of the heated oil is above the melting point of the lithium.

The oil is dispersed by the high speed agitation of the rotary mixture 630. Also dispersed is the stream of molten lithium to thereby form small droplets of the lithium. The smaller droplets, down to super fine diameter size particles, progressively travel downwardly driven by the agitator even though ordinarily the light weight particles would rise upwardly in the chamber. Actually larger droplets rise and smaller droplets fall in a classifying action.

The atomizing chamber 628 also has a top opening 630 into which is connected a conduit 640. The conduit has a generally horizontal atomizing chamber connection 642 and a vertical leg 643 which acts as an oil vapor condenser and through which ether vapor carried over by the return oil stream is drawn off. Also chamber 628 has a bottom drain line 653 which is used to remove the formed super fine lithium particles of various mean diameters by varying the depth of penetration of the line 653 of an upper distal leg 654 and conduit them to the next processing stage. The larger lithium particles always tend to rise back through the rotary blades because of their lower density (0.56) relative to the oil (0.86).

As seen in FIG. 24, the continuous lithium particle producing equipment also includes a recouperator 666 and a water-cooled settling chamber 668 in which a lithium layer 670, an ether layer 671, an ether-oil layer 672 and the oil layer formed by oil 634. The layers are formed and remain separated from each other. The lithium particles are drawn off or merely scooped off the top of the stratified mixture.

As noted in FIG. 24, the relatively cold oil in the settling chamber and some ether in solution returned by pump via the recouperator for preheating, to produce more lithium particles in a continuous manner.

The hydrocarbon oil, which surprisingly forms the lithium particles into liquid droplets and then chills them to form relatively uniform finely divided, generally spherically shaped solid particles, is stored in the system as the bottom reservoir layer in the settling tank 668.

The oily material 634 may be a mineral oil or other oily material such as petroleum jelly. Best results are obtained when the boiling point of the hydrocarbon or oily material is not substantially below 225° C. although oil having a boiling point as low as 190 or 200° C. can be used in the process.

The density of the oily material is of some importance in order to produce a separating action between the lithium particles in the atomizing chamber 628. The specific gravity of the oil, which is preferably a viscous mineral oil, should be about 0.8 to about 0.9 for best results although oily material having a specific gravity in the range of as low as about 0.65 to 0.7 to as high as about 0.95.

Also, as previously indicated the viscosity of the oily material is preferably relatively high. A range of 200 to 8000 S.U.S. at 100° F. may be used although a range of 2000 to 4000 is highly preferred.

The above described oil is moved from the lower settling chamber reservoir layer to the recouperator tank 666 through conduit 675 by means of a pump 676. The pump 676 then forces the oil through a heat exchange oil 677 in which the oil is heated while cooling and at the same time removing heat from the hot lithium-oil dispersion taken off from the bottom of the chamber 628. The heating coil then terminates into the pipe 632, which as previously described, conducts oil into the agitation chamber 628.

As noted in FIG. 24, the lithium particles are forced to disperse by mechanical agitation through a stream of oil and then flow through against the force of gravity. (The preferred specific gravity at 100° C. being lithium—0.56, oil—0.86.)

Thus the fine lithium particles pass countercurrently with respect to the path of the oil being stirred in chamber 628. Further, the oil is used to solidify the lithium and at the same time the heat of solidification is passed to the incoming oil which is heated for initial contact with new lithium in the molten stream thereof.

As seen in the drawings, a recouperator exit line 679 is located at the top of the recouperator which conducts the lithium particles and oil mixture into the settling tank. The settling tank has a cold water loop 680 passing through its middle and lower portion and a refrigeration loop 681 passing through its upper portion.

The cold water loop 680 cools the lithium, the ether, the oil-ether, and oil layers; while the refrigeration loop 681 cools and condenses the ether vapor returning from the atomizer-scrubber 628 to form a fresh supply of the ether. This loop 681 also prevents ether loss to the atmosphere while the lithium is being removed. Thus, the ether is condensed in the settling tank to wash the lithium layer and is vaporized on entering the chamber 628.

An important part of the atomizer chamber 628 is the high speed stirrer 630 which is rotated in a mercury or sealed bearing 683 to give the lithium-oil mixture the required agitation to form droplets of molten lithium. Rapid agitation is necessary in the present process as well as a correct temperature gradient is also necessary in the chamber 628 in order to properly cool and solidify the droplets without their sticking together to form a useless conglomerated mass.

The above described equipment may be used to continuously produce lithium particles of an average diameter size of as low as about 2 to 5 microns and as high as 100 to 200 microns. In accordance with the present invention, a small continuous system such as shown in FIG. 24 can be set up to produce sizeable amounts, say 5 to 10 lbs. of the finely divided lithium particles in one hour.

The agitating chamber 628 may be of a size on the order of 105 cm. in height and 50 cm. in diameter. The lithium heater 625 may advantageously be of a size of about 20 centimeters in height and 15 cm. in diameter.

In the embodiment shown in FIG. 24, the temperature of the lithium heater is about 200° C., and it is heated by an electrical heating jacket of a 2 kilowatt size. The temperature in the agitating and atomizing chamber 628, (which is of some importance inasmuch as it generally should be above 150° but less than 200° centigrade) is about 160° C. in its lower one-third portion and about 175° C. in its middle portion. The temperature is about 190° C. in its upper portion—just above the entrance of the molten lithium into the chamber 478.

In the embodiment shown in FIG. 24, the chamber 628 has an outside electrical heating jacket 685 located near the portion of the tank where the molten lithium enters. The jacket 685 keeps the lithium molten until it is dispersed into the interior of the tank where it is agitated in the oil and its finest particles flow down to the chamber bottom countercurrent to its gravitational tendency.

As seen in FIG. 24, the diameter in the settling tank and the recouperator may be about the same diameter size as the agitating chamber, which may be of about 15 centimeters. In general, the settling tank is of about the same length as the agitating chamber and the recouperator is of lesser length, say about ½ the length of the agitating chamber.

As to further details of the processing, the temperature at the top of the recouperator may be about 40° to 45° C., while the temperature in the oil reservoir portion of the settling tank should be about 30 to 50° and preferably 40° C. The temperature should be about 10 to 30° C. in the ether layer of the settling tank, which is near the entrance of the cold water loop 680 into the settling tank in the embodiment shown. Up at the top of the settling tank near the entrance of the refrigeration loop 681, the temperature might be 0 to 10° C. This low temperature is required to condense effectively the ether vapor and prevent its escape from the settling chamber. Thus, a worker can easily dip or scoop out lithium without danger of breathing the ether vapors.

The pump 676 may move about one-half of a kilogram of material per minute in the equipment described in order to effectively form the amount of lithium previously described, namely 5 to 10 lbs. per hour.

In the above described equipment, other low melting point metals may be formed into finely divided particles from their solid state using varied temperatures which are required due the difference in melting points. Other suitable metals are sodium and potassium and their alloys. The equipment may be used to make phosphorous particles substituting water for the oil and using 45 to 55° C. and preferably 50° C. for the fusion temperature.

Petroleum ether or other suitable low boiling organic liquid may be used to effectively replace the ethyl ether. The petroleum ether provides good results because of a higher boiling point. The higher the boiling point of the ether, the safer is the operation. Thus petroleum ether with a boiling point of over 95° C. and preferably over 100° C. should be used.

It should be noted that the lithium may be left in the petroleum jelly or petroleum grease if produced in the correct and desirable hydrocarbon-metal rate for use in semi solid fuel compositions. The mixture may then be used alone or mixed with other metals and/or hydrides in a second operation.

The following example illustrates the continuous preparation of finely divided lithium particles:

*Example 12*

A solid lithium block was melted and processed through equipment such as shown in FIG. 24. The lithium was melted at 200° C. and allowed to flow into an agitating tank such as chamber 628. The temperature inside the tank was at about 190° C. at the point where the lithium flowed into the atomizer chamber. At a point near the bottom agitating tank of the temperature was 160° C. The dimensions of the agitating tank were 15 centimeters by 102 centimeters. The tank was equipped with a high speed stirrer which rotated at 3000 r.p.m.

The oil used was a mineral oil having a boiling point of 250° C., a viscosity of 2000 S.U.S. at 100° F. and a specific gravity of 0.86.

The ether used was petroleum ether having a boiling point of 110°–120° C.

The pump was operated at a rate of about ½ kilogram of oil per minute and the output of the lithium particles was 1 kilogram per hour. The average particle size of the lithium particles was 50 microns.

The resultant lithium particles were found to be excellent starting materials to prepare lithium-bound fuel slugs as described in the previous examples.

It is to be understood that further modifications of the compositions, methods and apparatus of the present invention may be made without departing in spirit and scope from the present invention.

What is claimed is:

1. A solid fuel capable of delivering a high thrust for propulsion in torpedo, rocket and ram-jet engine systems comprising about 50 to 90 parts by weight of finely divided high energy particles of a metal-containing fuel dispersed and encased within about 10 to 50 parts by weight of a metallic matrix which also burns to provide energy for propulsion said fuel particles being selected from a member of the group consisting of a metal, a metal hydride and a metal carbide in which the metal is selected from a member of the group consisting of aluminum, magnesium, titanium, lithium, silicon, boron and beryllium and said metallic matrix is selected from a member of the group consisting of lithium, magnesium, aluminum, boron, a magnesium-aluminum alloy, a magnesium-lithium alloy, a magnesium-lithium-aluminum alloy and an aluminum-lithium alloy, the metallic matrix fused around and surrounding each fuel particle to disperse the fuel particles substantially uniformly throughout the solid fuel.

2. A solid fuel capable of delivering energy for propulsion in engine systems such as rockets, ram-jets and torpedos comprising (1) about 60 to 80 parts by weight of finely divided high energy delivering metal-containing fuel particles in which the average particle size is about 5 to 150 microns (2) about 10 to 30 parts by weight of finely divided particles of a combustion conditioning agent which sputter and burn to disperse said fuel particles and provide cracks in the burning surfaces of said fuel particles to expose fresh fuel surfaces and (3) about 20 to 60 parts by weight of a metallic binder matrix for said particles of fuel and combustion conditioning agent to uniformly disperse and hold said particles, said fuel particles being selected from a member of the group consisting of a metal, a metal hydride and a metal carbide in which the metal is selected from a member of the group consisting of aluminum, magnesium, titanium, lithium, silicon, boron and beryllium and said metallic matrix is selected from a member of the group consisting of lithium, magnesium, aluminum, boron, a magnesium-aluminum alloy, a magnesium-lithium alloy, a magnesium-lithium-aluminum alloy and an aluminum-lithium alloy, each of said fuel particles being surrounded and coated by the metallic matrix.

3. A solid fuel comprising about 50 to 90 parts by weight of finely divided metallic hydride particles having an average size of about 5 to 150 microns dispersed and bound within about 10 to 50 parts by weight of a matrix of lithium, said lithium being fused around each of the hydride particles to encase the same.

4. A method of using a fuel composition comprising metal-containing fuel particles and a metallic binder therefor in which each of the fuel particles is encased and surrounded by the metallic binder in an underwater vehicle powered by inertial propulsion, the method comprising the steps of oxidizing said fuel composition to obtain hydrogen gas in which the fuel particles are selected from a member of the group consisting of a metal, a metal hydride and a metal carbide in which the metal is selected from a member of the group consisting of aluminum, magnesium, titanium, lithium, silicon, boron and beryllium and said metallic binder is selected from a member of the group consisting of lithium, magnesium, aluminum, boron, a magnesium-aluminum alloy, a magnesium-lithium alloy, a magnesium-lithium-aluminum alloy and an aluminum-lithium alloy, and filling a container with said hydrogen gas to provide a buoyant upward force for said vehicle and removing said gas from said container to provide a downward force for said vehicle.

5. A solid fuel composition suitable for a ram-jet engine comprising 60 to 70 parts by weight of aluminum particles, 10 to 25 parts by weight of lithium hydride particles and 10 to 15 parts by weight of an elemental lithium binder containing said particles dispersed therein, each of said aluminum particles and each of said lithium hydride particles being enclosed and encased by the fused lithium binder.

6. A solid fuel capable of reacting with steam and water vapor and providing a specific impulse as high as 300 comprising about 10 to 40 parts by weight of a lithium binder which is water reactive, about 20 to 80 parts by weight of magnesium particles and about 5 to 20 parts by weight of particles of lithium hydride, in which said lithium binder encloses and encases each of the magnesium particles and each of the lithium hydride particles to distribute the same substantially uniformly throughout the solid fuel.

7. A method of preparing a solid fuel slug comprising a plurality of powdered metallic hydride particles dispersed and bound within a continuous lithium matrix in which each of said particles is coated by and encased within lithium, said method comprising the steps of (1) mixing powdered lithium and powdered metal hydride, (2) heating the mixture to a temperature below the decomposition temperature of said hydride and (3) compacting the mixture to obtain flow of the heated and compacted lithium to surround and encase each of the hydride particles to form a solid fuel slug.

8. A method of obtaining energy from a solid fuel comprising the steps of melting to a flowable state a solid fuel comprising a plurality of metal-containing fuel particles bound within a matrix of lithium in which the fuel particles are selected from a member of the group consisting of a metal, a metal hydride and a metal carbide in which the metal is selected from a member of the group consisting of aluminum, magnesium, titanium, lithium, silicon, boron and beryllium and each of the fuel particles being coated and encased within the matrix of lithium, extruding said fuel into a chamber, vaporizing and decomposing the fuel, and superheating the decomposed products to obtain energy for propulsion therefrom.

9. In an underwater vehicle inertially propelled by hydrogen gas which is trapped and released within a chamber in said vehicle, a fuel cell containing a solid fuel comprising metal containing fuel particles, means for transporting said hydrogen gas to an expandible and collapsible bag including a conduit between said bag and said fuel cell, a valve located in said conduit and a depth sensing element for actuating said valve for providing a flow of hydrogen gas from said fuel cell to said bag to expand the same and provide an upward force for said initially propelled vehicle, means for releasing the gas from said bag including a second valve in said conduit which is activated when said vehicle reaches a predetermined level to thereby release hydrogen gas from said bag to provide a downward movement for said underwater vehicle and a metal binder therefor, said fuel particles being selected from a member of the group consisting of a metal, a metal hydride and a metal carbide in which the metal is selected from a member of the group consisting of aluminum, magnesium, titanium, lithium, silicon, boron and beryllium, each of said fuel particles being surrounded and encased in the fused metal binder, the metal binder being selected from a member of the group consisting of lithium, magnesium, aluminum, boron, a magnesium-aluminum alloy, a magnesium-aluminum alloy, a magnesium-lithium-aluminum alloy and an aluminum-lithium alloy, means for oxidizing said fuel to produce hydrogen gas including a pump and an inlet opening in said fuel cell for introducing sea water therein to oxidize said solid fuel and means for trapping and releasing the gas to provide upward buoyant forces and downward sinking forces including said bag.

10. A solid fuel capable of delivering a high thrust for propulsion in torpedo, rocket and ram-jet engine systems comprising about 50 to 90 parts by weight of finely divided high energy particles of a metal-containing fuel dispersed and encased within about 10 to 50 parts by weight of a lithium matrix which also burns to provide energy for propulsion, said fuel particles having a melting point higher than said lithium and being selected from a member of the group consisting of a metal, a metal hydride and a metal carbide in which the metal is selected from a member of the group consisting of aluminum, magnesium, titanium, lithium, silicon, boron and beryllium.

References Cited by the Examiner

UNITED STATES PATENTS

| | | | |
|---|---|---|---|
| 952,451 | 3/10 | Leon | 114—20 |
| 952,452 | 3/10 | Leon | 114—20 |
| 2,254,549 | 9/41 | Small | 75—200 X |
| 2,351,750 | 6/44 | Fawkes | 114—20 |
| 2,584,127 | 2/52 | Harcum et al. | 114—23 |
| 2,699,576 | 1/55 | Colbry et al. | 18—47.2 |
| 2,728,107 | 12/55 | Hershey | 18—47.2 |
| 2,740,702 | 4/56 | Mace | 149—76 |
| 2,783,138 | 2/57 | Parsons | 149—20 |
| 2,932,943 | 4/60 | Zwicky | 60—35.5 |
| 2,937,824 | 5/60 | Krumbholz et al. | 149—37 |
| 2,949,877 | 8/60 | Newburn et al. | 114—20 |
| 3,044,253 | 7/62 | Zwicky | 60—35.5 |

FOREIGN PATENTS 602,807   8/44   Great Britain.

CARL D. QUARFORTH, *Primary Examiner.*
LEON D. ROSDOL, *Examiner.*